(12) United States Patent
Kitahara

(10) Patent No.: US 11,552,720 B2
(45) Date of Patent: *Jan. 10, 2023

(54) RECEPTION APPARATUS, TRANSMISSION APPARATUS, AND DATA PROCESSING METHOD

(71) Applicant: SATURN LICENSING LLC, New York, NY (US)

(72) Inventor: Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,065

(22) Filed: Jun. 17, 2021

(65) Prior Publication Data

US 2022/0014293 A1 Jan. 13, 2022

Related U.S. Application Data

(63) Continuation of application No. 15/749,203, filed as application No. PCT/JP2017/023150 on Jun. 23, 2017, now Pat. No. 11,044,030.

(30) Foreign Application Priority Data

Jul. 8, 2016 (JP) .............................. JP2016-135888

(51) Int. Cl.
*H04H 60/43* (2008.01)
*H04N 21/434* (2011.01)
(Continued)

(52) U.S. Cl.
CPC .............. *H04H 60/43* (2013.01); *H04B 1/04* (2013.01); *H04B 1/16* (2013.01); *H04N 21/434* (2013.01);
(Continued)

(58) Field of Classification Search
CPC ........................... H04N 21/4345; H04N 21/63
(Continued)

(56) References Cited

U.S. PATENT DOCUMENTS

2007/0204307 A1 8/2007 Lee
2010/0242067 A1* 9/2010 Song ................... H04N 21/4345
725/54
(Continued)

FOREIGN PATENT DOCUMENTS

CN 104320212 1/2015
CN 105684451 6/2016
(Continued)

OTHER PUBLICATIONS

Extended European Search Report dated Oct. 25, 2018 in European Patent Application No. 17824037.0, 8 pages.
(Continued)

*Primary Examiner* — Alfonso Castro
(74) *Attorney, Agent, or Firm* — Chris Kolefas

(57) ABSTRACT

The present technology relates to a reception apparatus, a transmission apparatus, and a data processing method that enable a frequency scan to be performed at a higher speed. The reception apparatus can receive a broadcast wave, perform the frequency scan on the broadcast wave on the basis of the number of providers information indicating the number of broadcasting providers providing a service in the same frequency band, and generate channel selection information for selecting the service, thereby enabling the frequency scan at a higher speed. The present technology is applicable to, for example, a receiver capable of receiving digital broadcasting.

15 Claims, 15 Drawing Sheets

(51) Int. Cl.
  *H04N 21/438* (2011.01)
  *H04B 1/16* (2006.01)
  *H04B 1/04* (2006.01)
  *H04N 21/462* (2011.01)

(52) U.S. Cl.
  CPC ......... *H04N 21/438* (2013.01); *H04N 21/462* (2013.01)

(58) Field of Classification Search
  USPC .......................................................... 725/151
  See application file for complete search history.

(56) References Cited

U.S. PATENT DOCUMENTS

| | | | |
|---|---|---|---|
| 2012/0121035 A1 | 5/2012 | Song | |
| 2015/0150055 A1* | 5/2015 | Hwang | H04N 21/4345 725/54 |
| 2016/0359574 A1* | 12/2016 | Lee | H04L 65/607 |
| 2016/0373807 A1 | 12/2016 | Kwak et al. | |
| 2017/0164331 A1 | 6/2017 | Kitazato et al. | |
| 2018/0139650 A1* | 5/2018 | Kwon | H04W 28/065 |

FOREIGN PATENT DOCUMENTS

| | | |
|---|---|---|
| EP | 1 928 168 A1 | 6/2008 |
| JP | 2015-073244 A | 4/2015 |
| KR | 10-2016-0033115 A | 3/2016 |
| WO | 2015/174298 A1 | 11/2015 |
| WO | 2016/060422 A1 | 4/2016 |
| WO | 2016108606 | 7/2016 |

OTHER PUBLICATIONS

International Search Report dated Sep. 5, 2017 in PCT/JP2017/023150 filed Jun. 23, 2017.
ATSC Proposed Standard: Physical Layer Protocol (A/322), ATSC Advanced Television Systems Committee, ATSC S32-230r56, Jun. 29, 2016, 258 pages.

* cited by examiner

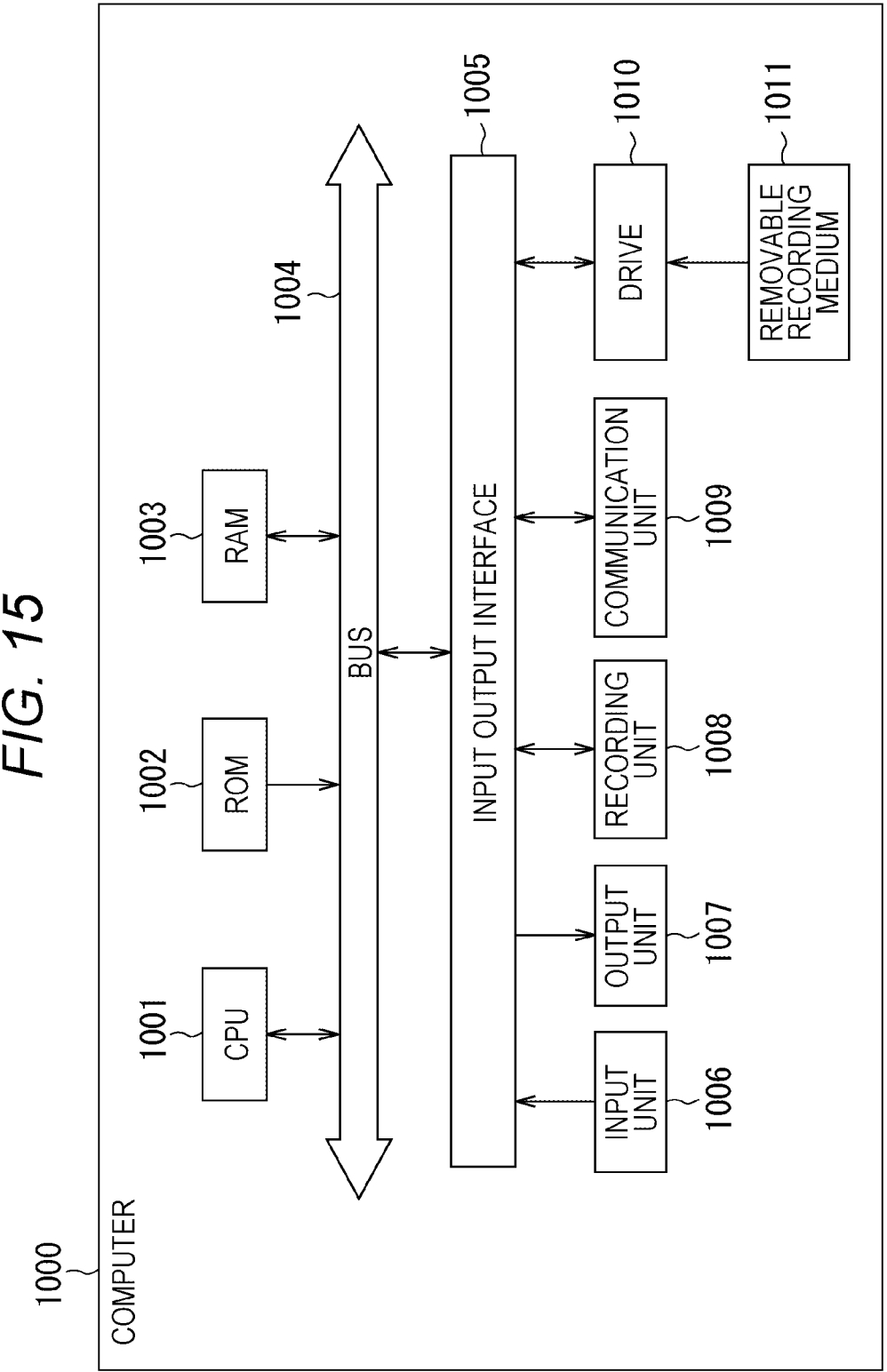

RECEPTION APPARATUS, TRANSMISSION APPARATUS, AND DATA PROCESSING METHOD

CROSS REFERENCE TO RELATED APPLICATIONS

This application is a continuation of U.S. application Ser. No. 15/749,203, filed on Jan. 31, 2018, and is based upon and claims the benefit of priority to International Application No. PCT/JP2017/023150, filed on Jun. 23, 2017 and JP 2016-135888, filed on Jul. 8, 2016. The entire contents of U.S. Ser. No. 15/749,203 are incorporated herein by reference.

TECHNICAL FIELD

The present technology relates to a reception apparatus, a transmission apparatus, and a data processing method, and more particularly to a reception apparatus, a transmission apparatus, and a data processing method configured to perform a frequency scan at a higher speed.

BACKGROUND ART

In a receiver capable of receiving terrestrial broadcasting, in a case where the receiver is used for the first time, it is possible to select a service by performing a so-called initial scan process and holding channel selection information about a selectable service (channel) (f or example, refer to Patent Document 1).

CITATION LIST

Patent Document

Patent Document 1: Japanese Patent Application Laid-Open No. 2015-073244

SUMMARY OF THE INVENTION

Problems to be Solved by the Invention

Now, in the initial scan process, the channel selection information can be obtained by repeating a frequency scan in each predetermined frequency band; however, depending on a mode of use of the frequency band, the frequency scan cannot be completed in each frequency band even after necessary information is acquired, and processing time of the initial scan process has become longer. Therefore, a proposal for performing the frequency scan at a higher speed has been desired.

The present technology has been made in view of such a situation, and is intended to enable the frequency scan at a higher speed.

Solutions to Problems

A reception apparatus according to a first aspect of the present technology is a reception apparatus including: a reception unit configured to receive a broadcast wave; and a control unit configured to perform a frequency scan on the broadcast wave on the basis of the number of providers information indicating the number of broadcasting providers providing a service in the same frequency band to generate channel selection information for selecting the service.

The reception apparatus according to the first aspect of the present technology may be an independent apparatus or an internal block constituting one apparatus. Also, a data processing method according to the first aspect of the present technology is a data processing method corresponding to the reception apparatus of the first aspect of the present technology described above.

In the reception apparatus and the data processing method according to the first aspect of the present technology, a broadcast wave is received, and the frequency scan on the broadcast wave is performed on the basis of number of providers information indicating the number of broadcasting providers providing the service in the same frequency band, and channel selection information for selecting the service is generated.

A transmission apparatus according to a second aspect of the present technology is a transmission apparatus including: a generation unit configured to generate the number of providers information indicating the number of broadcasting providers providing a service in the same frequency band; and a transmission unit configured to transmit the generated number of providers information by a broadcast wave.

The transmission apparatus according to the second aspect of the present technology may be an independent apparatus or may be an internal block constituting one apparatus. Also, a data processing method according to the second aspect of the present technology is a data processing method corresponding to the transmission apparatus of the second aspect of the present technology described above.

In the transmission apparatus and the data processing method according to the second aspect of the present technology, the number of providers information indicating the number of broadcasting providers providing the service in the same frequency band is generated, and the generated number of providers information is transmitted by a broadcast wave.

Effects of the Invention

According to the first aspect and the second aspect of the present technology, the frequency scan can be performed at a higher speed.

Note that effects described here are not necessarily limited, and any one of the effects described in the present disclosure may be obtained.

BRIEF DESCRIPTION OF DRAWINGS

FIG. 15 is a diagram illustrating a configuration example of a computer.

MODE FOR CARRYING OUT THE INVENTION

An embodiment of the present technology will be described below with reference to the drawings. Note that the description will be made in the following order.
1. Configuration of System
2. Outline of the Present Technology
3. Specific Example of Initial Scan Process of the Present Technology
4. Initial Scan Process Flow of the Present Technology
5. Modification
6. Configuration of Computer 1. Configuration of System (Configuration Example of Transmission System)

Figure 1:
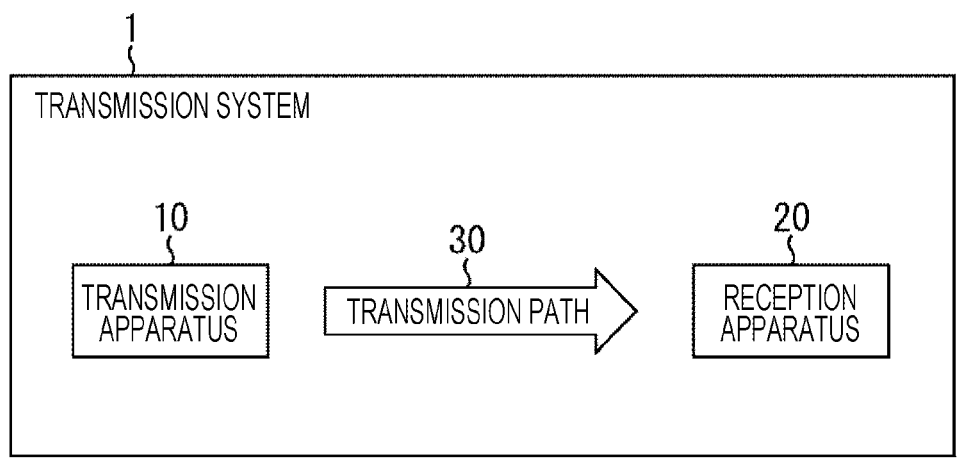
FIG. 1 is a diagram illustrating a configuration of one embodiment of a transmission system to which the present technology is applied.

FIG. 1 is a diagram illustrating a configuration of one embodiment of a transmission system to which the present technology is applied. Note that the system refers to a logical group of a plurality of apparatuses.

In FIG. 1, the transmission system 1 includes a transmission apparatus 10 and a reception apparatus 20. In this transmission system 1, data transmission conforming to a digital broadcasting standard is performed.

The transmission apparatus 10 is a transmitter that transmits content via a transmission path 30. For example, the transmission apparatus 10 transmits a broadcast stream including (components of) video, audio, and the like constituting content such as a broadcast program and a signaling as a broadcast wave via the transmission path 30.

The reception apparatus 20 is a receiver that receives the content transmitted via the transmission path 30. For example, the reception apparatus 20 receives the broadcast wave from the transmission apparatus 10, acquires (components of) video, audio, and the like constituting the content and the signaling from the broadcast stream, and reproduces the video and audio of the content such as a broadcast program.

Note that in the transmission system 1, the transmission path 30 may be, in addition to a terrestrial wave (terrestrial broadcast), for example, satellite broadcast using a broadcasting satellite (BS) or a communications satellite (CS), or cable broadcast using a cable (CATV: Common Antenna TeleVision) or the like.

(Configuration of Transmission Apparatus)

Figure 2:
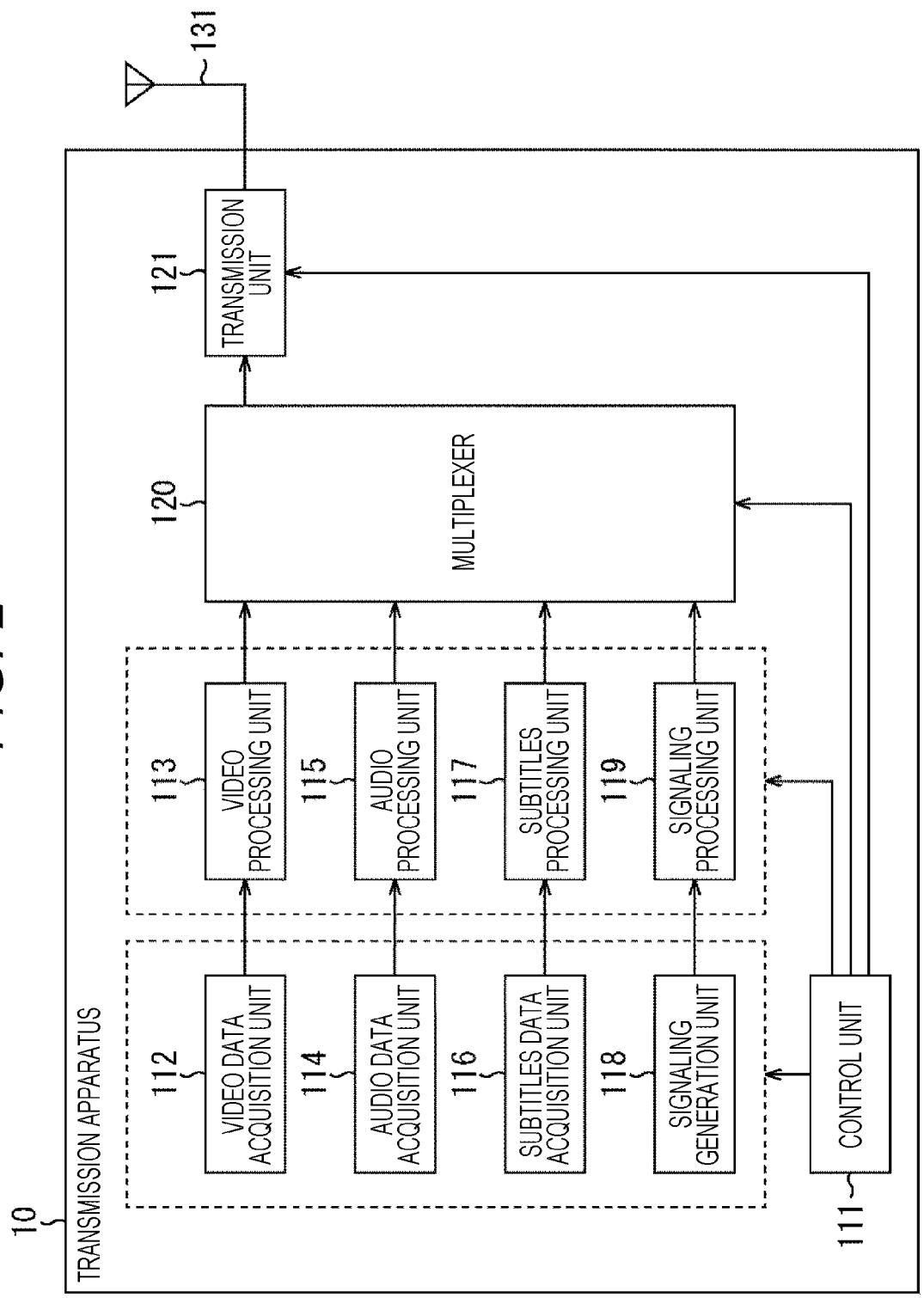
FIG. 2 is a diagram illustrating a configuration example of a transmission apparatus.

FIG. 2 is a diagram illustrating a configuration example of the transmission apparatus 10 of FIG. 1.

In FIG. 2, the transmission apparatus 10 includes a control unit 111, a video data acquisition unit 112, a video processing unit 113, an audio data acquisition unit 114, an audio processing unit 115, a subtitles data acquisition unit 116, a subtitles processing unit 117, a signaling generation unit 118, a signaling processing unit 119, a multiplexer 120, and a transmission unit 121.

The control unit 111 controls an operation of each unit of the transmission apparatus 10.

The video data acquisition unit 112 acquires video data of content such as a broadcast program from an external server, a camera, a recording medium, or the like, and supplies the video data to the video processing unit 113.

The video processing unit 113 applies, for example, a process such as an encoding process that conforms to a predetermined encoding method to the video data supplied from the video data acquisition unit 112, and supplies a resulting video stream to the multiplexer 120.

The audio data acquisition unit 114 acquires audio data of content such as a broadcast program from an external server, a microphone, a recording medium, or the like, and supplies the audio data to the audio processing unit 115.

The audio processing unit 115 applies, for example, a process such as an encoding process that conforms to a predetermined encoding method to the audio data supplied from the audio data acquisition unit 114, and supplies a resulting audio stream to the multiplexer 120.

The subtitles data acquisition unit 116 acquires subtitles data of content such as a broadcast program from an external server, a recording medium, or the like, and supplies the subtitles data to the subtitles processing unit 117.

The subtitles processing unit 117 applies, for example, a process such as an encoding process that conforms to a predetermined encoding method to the subtitles data supplied from the subtitles data acquisition unit 116, and supplies a resulting subtitles stream to the multiplexer 120.

On the basis of data that serves as a base of a signaling obtained from an external server, a recording medium, or the like, the signaling generation unit 118 generates the signaling and supplies the signaling to the signaling processing unit 119. Note that the signaling is, for example, control information to be used for processing such as selection of a service on a reception side and reproduction of content.

The signaling processing unit 119 processes the signaling supplied from the signaling generation unit 118, and supplies a resulting signaling stream to the multiplexer 120.

The multiplexer 120 multiplexes the video stream supplied from the video processing unit 113, the audio stream supplied from the audio processing unit 115, the subtitles stream supplied from the subtitles processing unit 117, and the signaling stream supplied from the signaling processing unit 119. The multiplexer 120 supplies a resulting multiplexed stream to the transmission unit 121.

The transmission unit 121 applies a necessary process (for example, a modulation process and the like) to the multiplexed stream supplied from the multiplexer 120, and transmits a resulting broadcast stream as a broadcast wave of digital broadcast via an antenna 131.

The transmission apparatus 10 is configured as described above.

Note that in FIG. 2, although the transmission apparatus is described to include one apparatus for the sake of convenience of description, the transmission apparatus 10 on a transmission side can be a system including a plurality of apparatuses that each have a function of a block of FIG. 2.

(Configuration of Reception Apparatus)

Figure 3:
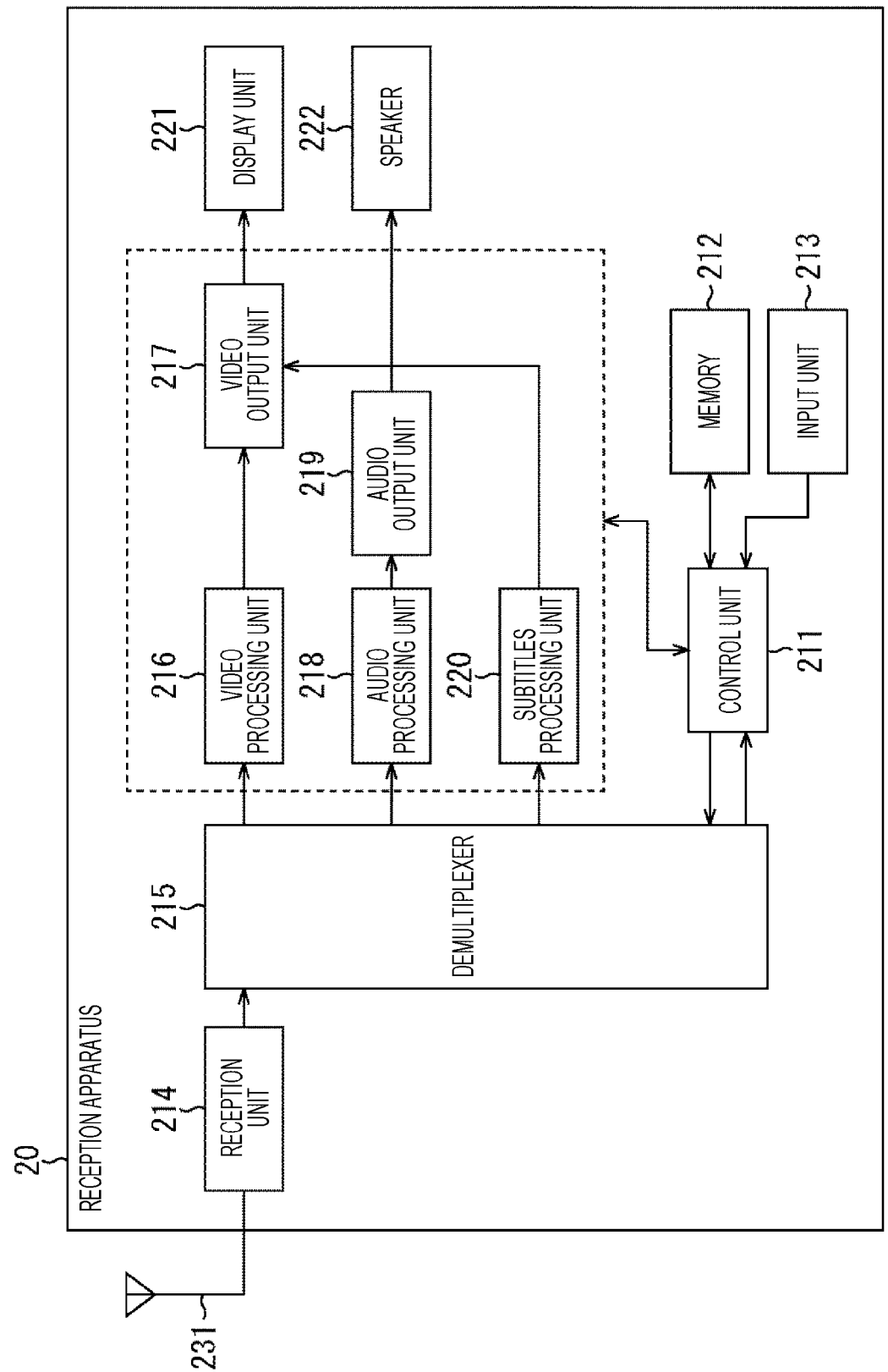
FIG. 3 is a diagram illustrating a configuration example of a reception apparatus.

FIG. 3 is a diagram illustrating a configuration example of the reception apparatus 20 of FIG. 1.

In FIG. 3, the reception apparatus 20 includes a control unit 211, a memory 212, an input unit 213, a reception unit 214, a demultiplexer 215, a video processing unit 216, a video output unit 217, an audio processing unit 218, an audio output unit 219, a subtitles processing unit 220, a display unit 221, and a speaker 222.

The control unit 211 includes, for example, a central processing unit (CPU), a microprocessor, and the like. The control unit 211 controls an operation of each unit of the reception apparatus 20.

The memory 212 includes, for example, a nonvolatile memory or the like such as a non volatile RAM (NVRAM). The memory 212 records various types of data according to control from the control unit 211.

The input unit 213 includes, for example, an input interface circuit and the like. The input unit 213 supplies an operation signal to the control unit 211 in response to a user operation. The control unit 211 controls an operation of each unit on the basis of the operation signal supplied from the input unit 213.

The reception unit 214 includes, for example, a tuner, demodulator, or the like. The reception unit 214 applies a necessary process (for example, a demodulation process and the like) to a broadcast stream obtained from a broadcast wave of digital broadcast received via an antenna 231, and supplies a resulting multiplexed stream to the demultiplexer 215.

The demultiplexer 215 includes, for example, a main system on chip (SoC) or the like. The demultiplexer 215 divides the multiplexed stream supplied from the reception unit 214 into a video stream, an audio stream, a subtitles stream, and a signaling stream.

The demultiplexer 215 supplies the video stream, the audio stream, the subtitles stream, and the signaling stream to the video processing unit 216, the audio processing unit 218, the subtitles processing unit 220, and the control unit 211, respectively.

The control unit 211 controls an operation of each unit on the basis of the signaling supplied from the demultiplexer 215. For example, the control unit 211 controls the demultiplexer 215 and the like at a time of initial scan, acquires channel selection information obtained from the signaling, and records the channel selection information in the memory 212. Also, for example, at a time of service selection, the control unit 211 controls the demultiplexer 215, a processing unit of each component, and the like on the basis of the channel selection information recorded in the memory 212, such that content of the service to be selected is reproduced.

The video processing unit 216 includes, for example, a video decoder or the like that supports a predetermined decoding method. The video processing unit 216 applies, for example, a process such as a decoding process that conforms to a predetermined decoding method to the video stream supplied from the demultiplexer 215, and supplies resulting video data to the video output unit 217.

The video output unit 217 includes, for example, an output interface circuit and the like. The video output unit 217 supplies the video data supplied from the video processing unit 216 to the display unit 221.

The display unit 221 includes, for example, a display such as a liquid crystal display (LCD) and an organic electroluminescence display (OELD). The display unit 221 displays video of content corresponding to the video data supplied from the video output unit 217, such as a broadcast program.

The audio processing unit 218 includes, for example, an audio decoder or the like that supports a predetermined decoding method. The audio processing unit 218 applies, for example, a process such as a decoding process that conforms to a predetermined decoding method to the audio stream supplied from the demultiplexer 215, and supplies resulting audio data to the audio output unit 219.

The audio output unit 219 includes, for example, an output interface circuit and the like. The audio output unit 219 supplies the audio data supplied from the audio processing unit 218 to the speaker 222.

The speaker 222 includes, for example, a speaker that supports a 2.0 ch stereo. The speaker 222 outputs audio of content corresponding to the audio data supplied from the audio output unit 219, such as a broadcast program.

The subtitles processing unit 220 includes, for example, a subtitles decoder or the like that supports a predetermined decoding method. The subtitles processing unit 220 applies, for example, a process such as a decoding process that conforms to a predetermined decoding method to the subtitles stream supplied from the demultiplexer 215, and supplies resulting subtitles data to the video output unit 217.

The video output unit 217 causes the subtitles corresponding to the subtitle data supplied from the subtitles processing unit 220 to be superimposed and displayed on the video corresponding to the video data supplied from the video processing unit 216. With this arrangement, the subtitles superimposed on the video of content such as a broadcast program is displayed on the display unit 221.

Note that it can be said that in the reception apparatus of FIG. 3, a so-called rendering process is performed by the video processing unit 216, the video output unit 217, the audio processing unit 218, the audio output unit 219, and the subtitles processing unit 220.

The reception apparatus 20 is configured as described above.

Note that the reception apparatus 20 is configured, for example, as a fixed receiver such as a television receiver and a set top box (STB), or a mobile receiver equipped with a tuner such as a mobile phone and a smartphone. Also, the reception apparatus 20 may be a vehicle-mounted apparatus mounted in a vehicle.

Also, in the configuration of FIG. 3, the reception apparatus 20 includes the display unit 221 and the speaker 222; however, the reception apparatus 20 may not include the display unit 221 and the speaker 222. Also, the reception apparatus 20 may be provided with a communication function for connecting to a communication line such as the Internet.

2. Outline of the Present Technology

Now, the following describes a case where, as a transmission method, the present technology employs not an MPEG2-transport stream (TS) method that is currently widely used, but an Internet Protocol (IP) transmission method that uses, for a digital broadcast, an IP packet used in a field of communication. For example, the advanced television systems committee (ATSC) 3.0 which is one of the next-generation terrestrial broadcast standards is also assumed to employ the IP transmission method and enable provision of more advanced services.

(Protocol Stack)

Figure 4:
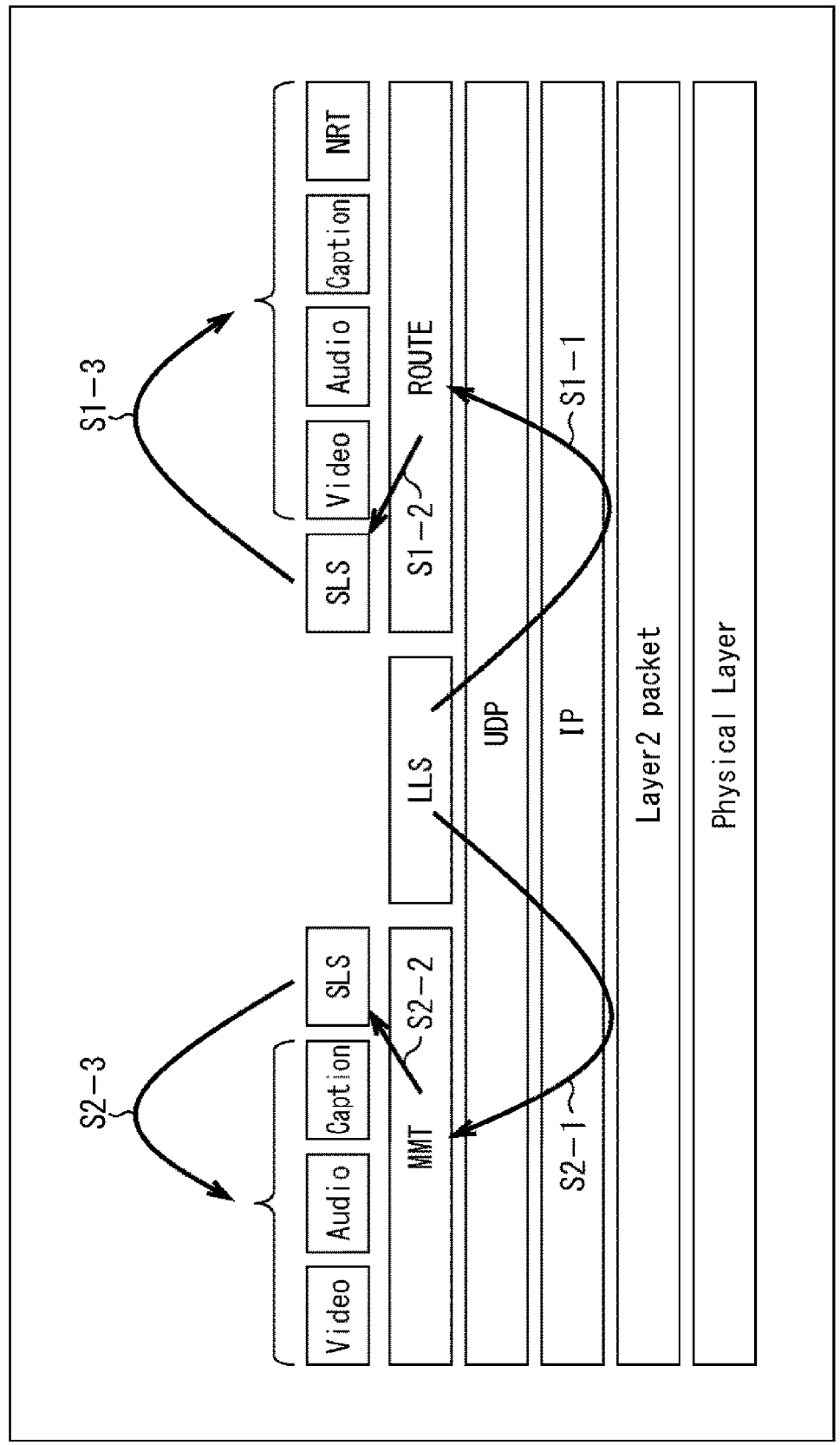
FIG. 4 is a diagram illustrating a protocol stack of an IP transmission method to which the present technology is applied.

FIG. 4 is a diagram illustrating a protocol stack of the IP transmission method to which the present technology is applied.

In FIG. 4, the lowest layer is a physical layer of a broadcast. An upper layer adjacent to this physical layer is a layer 2, and an upper layer adjacent to the layer 2 is an IP layer. Also, an upper layer adjacent to the IP layer is a user datagram protocol (UDP) layer.

That is, an IP packet including a UDP packet (IP/UDP packet) is placed in a payload of a layer-2 L2 packet (ALP (ATSC Link-Layer Protocol) packet) and encapsulated. Also, an L1 frame (physical frame) of the physical layer of a broadcast includes a preamble and a data part. Data is mapped in the data part, the data being obtained by adding parity for error correction to a base band (BB) packet obtained by encapsulating a plurality of L2 packets, and then performing a process regarding the physical layer such as interleaving and mapping.

Upper layers adjacent to the UDP layer are a low level signaling (LLS), real-time object delivery over unidirectional transport (ROUTE), and MPEG media transport (MMT).

Here, in ATSC 3.0, it is assumed that a low level signaling (LLS) and service layer signaling (SLS) are used as the signaling. The LLS is a signaling to be transmitted in a layer lower than the SLS. The SLS is a signaling of a service unit. That is, in ATSC 3.0, the signaling in the transport layer is transmitted in two layers of the LLS and the SLS.

The LLS is stored and transmitted in the IP/UDP packet. The LLS includes metadata such as a service list table (SLT), a rating region table (RRT), and a common alerting protocol (CAP).

The SLT metadata includes basic information indicating a structure of a stream and service in a broadcast network, such as information necessary for selecting a service (channel). The RRT metadata includes rating information used for parental control. The CAP metadata includes information regarding an emergency alarm message.

Also, the ROUTE is a protocol for streaming file transfer and is an extension of file delivery over unidirectional transport (FLUTE). With this ROUTE session, SLS files, DASH segment files (video, audio, caption), and non real time (NRT) content files are transmitted for each service.

The SLS is a signaling of a service level and provides information, attribute, and the like necessary for finding and selection of a component that belongs to a target service. The SLS includes metadata such as user service bundle description (USBD), service-based transport session instance description (S-TSID), and media presentation description (MPD).

The USBD metadata includes information such as an acquisition source of other metadata.

The S-TSID metadata is an extension of LCT session instance description (LSID) for ATSC 3.0 and is control information for the ROUTE protocol. Also, the S-TSID metadata can identify extended FDT (EFDT) transmitted in the ROUTE session. The EFDT is an extension of a file delivery table (FDT) introduced in the FLUTE and is control information for transfer.

The MPD metadata is control information of video and audio files to be used for streaming delivery conforming to MPEG-DASH. Here, the MPEG-DASH is a streaming delivery standard according to over the top video (OTT-V) and is a standard regarding adaptive streaming delivery using a streaming protocol based on hypertext transfer protocol (HTTP).

According to this MPEG-DASH standard, a manifest file for describing metadata that is control information for video and audio files, and a file format for transmitting moving image content are prescribed. Here, the former manifest file is referred to as media presentation description (MPD), and the latter file format is also referred to as a segment format.

Note that the metadata such as SLT, RRT, and CAP as LLS and metadata such as USBD, S-TSID, and MPD as SLS can be, for example, text-format data described in a markup language such as an extensible markup language (XML).

In this manner, streams of video, audio, and subtitles, streams of SLS, and streams of NRT content transmitted in the ROUTE session are stored in the IP/UDP packet and transmitted. Note that the NRT content is content to be delivered by the non real time (NRT) broadcast and is reproduced after being temporarily stored in a storage of the reception apparatus 20. Also, files other than the NRT content (for example, application files) may be transmitted in the ROUTE session.

Meanwhile, streams of video, audio, and subtitles and SLS streams transmitted in the MMT session are stored in the IP/UDP packet and transmitted.

In the IP transmission method to which the present technology is applied, since the aforementioned protocol stack is employed, at a time of selection of the service (channel) provided by the component stream transmitted in the ROUTE session, the reception apparatus 20 acquires the SLS transmitted in the ROUTE session according to the channel selection information obtained from the SLT metadata in the LLS (S1-1, S1-2).

Then, the reception apparatus 20 connects to the component stream of the selected service according to metadata such as USBD, S-TSID, and MPD (S1-3). With this arrangement, the reception apparatus 20 outputs an image and audio of content such as a broadcast program in response to a service selection operation.

Also, at a time of selection of the service provided by the component stream transmitted in the MMT session, the reception apparatus 20 acquires the SLS transmitted in the MMT session according to the channel selection information obtained from the SLT metadata in the LLS (S2-1, S2-2). Then, the reception apparatus 20 connects to the component stream of the selected service according to various types of metadata (S2-3). With this arrangement, the reception apparatus 20 outputs an image and audio of content such as a broadcast program in response to a service selection operation.

(Structure of LLS Packet)

Figure 5:
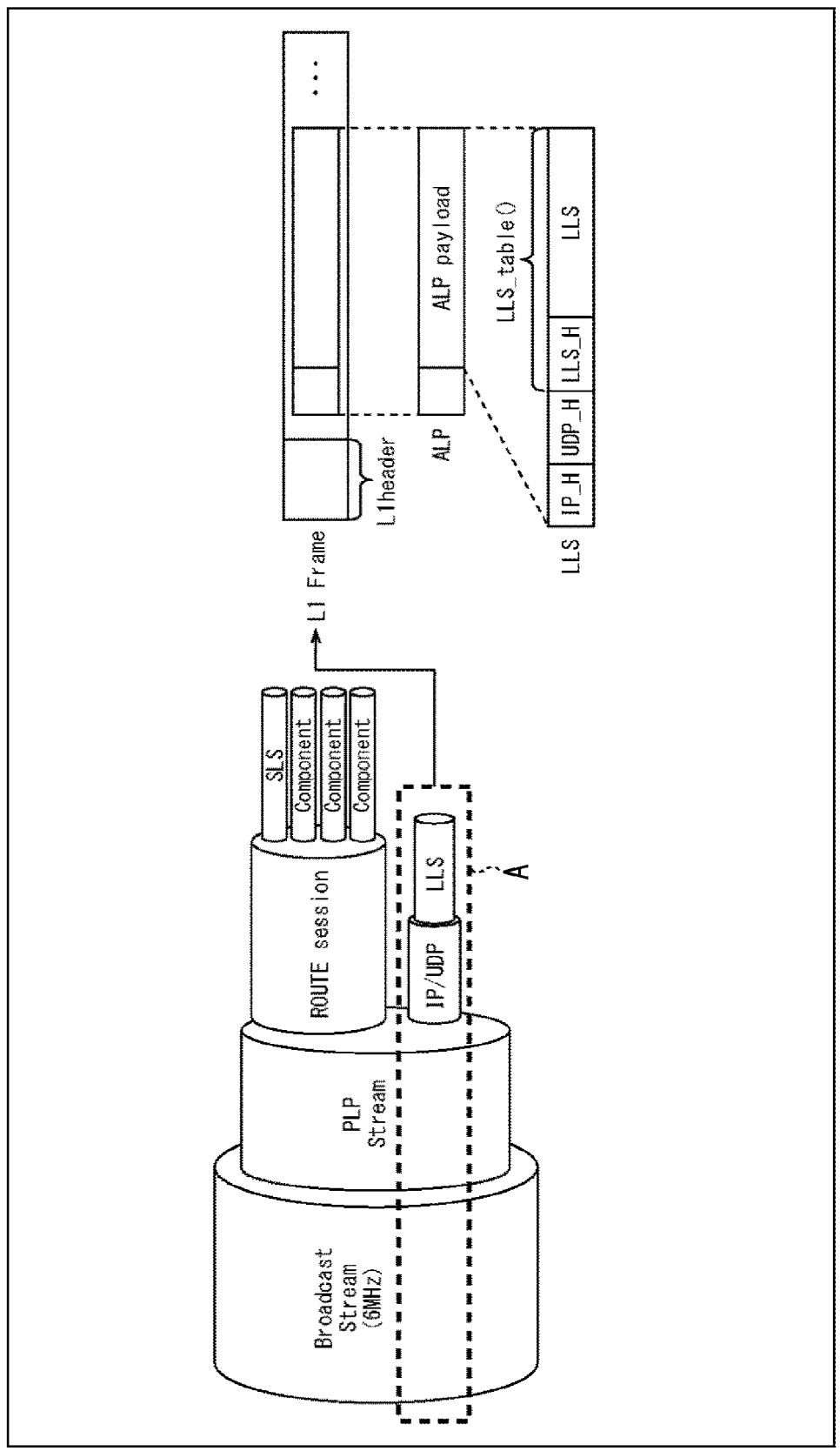
FIG. 5 is a diagram illustrating a structure of an LLS packet.

FIG. 5 is a diagram illustrating a structure of an LLS packet.

As illustrated in FIG. 5, a broadcast stream transmitted in a frequency band (for example, 6 MHz) corresponding to a predetermined RF channel includes one or more physical layer pipes (PLP) according to an operation mode. In the PLP, the LLS stream and streams in the ROUTE session are transmitted in the IP/UDP packet.

However, in the broadcast stream, the LLS stream is transmitted as one session with a fixed IP address and port number prescribed in advance, such as an IP address of "224.0.23.60" and a port number of 4937, for example. Also, the streams in the ROUTE session include component streams such as video, audio, and subtitles, and the SLS stream.

Here, if attention is paid to the LLS stream surrounded by dotted line A in the diagram, one or more ATSC link-layer protocol (ALP) packets are placed in a data part of an L1 frame of the physical layer, and one or more LLS packets are placed in a payload part of the ALP packet.

However, since the LLS packets are stored in the IP/UDP packet, an IP header part (IP_H) and a UDP header part (UDP_H) are added. Also, the LLS packets include an LLS table (LLS_table ( )). The LLS table includes a header part (LLS_H) and a payload part. In the LLS table, various types of header information are placed in the header part, and the LLS such as SLT metadata and RRT metadata are placed in the payload part.

Figure 6:
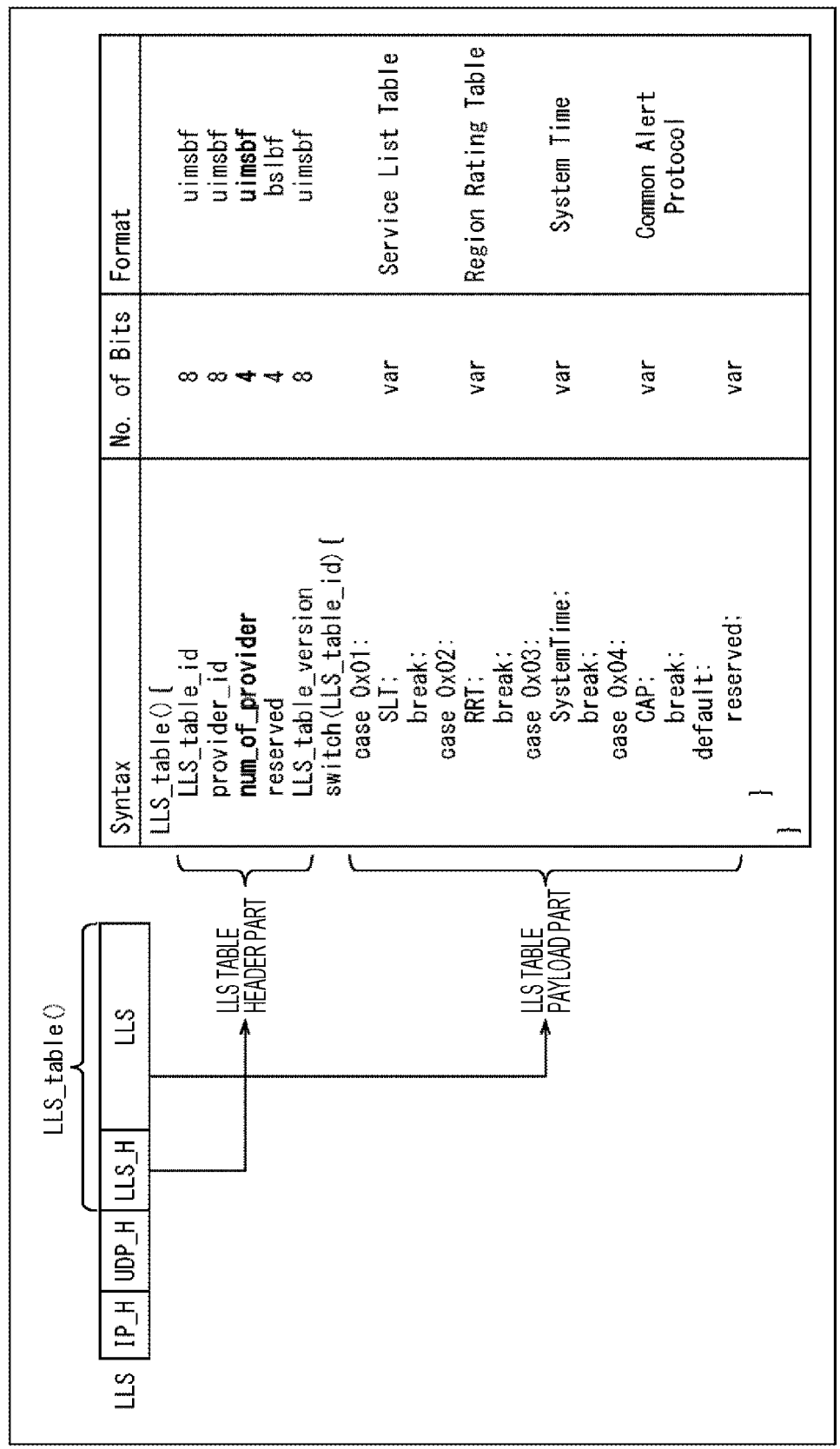
FIG. 6 is a diagram illustrating an example of syntax of an LLS table.

FIG. 6 illustrates an example of syntax of the header part and the payload part of the LLS table.

The header part of the LLS table includes LLS_table_id, provider_id, num_of_provider, and LLS_table_version as header information.

The 8-bit LLS_table_id is an ID for identifying the LLS such as the SLT metadata and the RRT metadata.

The 8-bit provider_id is an ID for identifying a broadcasting provider (for example, a broadcasting station).

The 4-bit num_of_provider is information indicating the number of broadcasting providers (for example, broadcasting stations) that provide services in the same frequency band (for example, 6 MHz). Hereinafter, this information is also referred to as number of providers information.

The 8-bit LLS_table_version is information indicating a version of the LLS table.

Note that a 4-bit extension area (reserved) is provided in the header part of the LLS table.

The payload part of the LLS table is branched to a statement following case according to a value of LLS_table_id designated as a control expression of a switch statement.

That is, in a case where LLS_table_id is "0x01", the SLT metadata is placed in the payload part of the LLS table. Also, in a case where LLS table_id is "0x02", the RRT metadata is placed. In a case where LLS_table_id is "0x03", the time information (SystemTime) is placed. In a case where LLS_table_id is "0x04", the CAP metadata is placed.

Note that in a case where unsigned integer most significant bit first (uimsbf) is specified as a format in FIG. 6, this means that a bit operation is performed and the information is handled as an integer. Also, in a case where bit string, left bit first (bslbf) is specified, this means that the information is handled as a bit string.

The LLS table stored in the LLS packet is configured as described above.

In that connection, at a time of initial setting, the reception apparatus 20 performs an initial scan process, acquires information indicating services (channels) that can be viewed in a target area, and generates channel selection information (channel list) for selecting a service. Also, in addition to the time of initial setting, for example, in a case where the reception apparatus 20 moves and the viewing area changes, the reception apparatus 20 performs a rescan process and generates the channel selection information (channel list) again.

In the reception apparatus 20, a frequency scan is performed by the reception unit 214 such as a tuner in the initial scan process or the rescan process, and after a frequency band of a predetermined RF channel is selected, the SLT metadata and the RRT metadata included in the LLS table are acquired by capturing the LLS stream with the fixed IP address and port number prescribed in advance. That is, in this frequency scan, the channel selection information (channel list) is obtained by allowing two tables of the SLT metadata and the RRT metadata to be acquired as the LLS.

Here, as a mode of service that can be provided by a broadcast stream transmitted in the frequency band of one RF channel, three patterns are assumed including, first, one service (channel) operated by one broadcasting provider, second, two or more services (channels) operated by one broadcasting provider, and third, two or more services (channels) shared by a plurality of broadcasting providers.

In particular, in the next-generation ATSC 3.0, as a point different from the current ATSC 1.0, an operation is assumed in which a plurality of services (channels) is transmitted in one RF channel as listed in the second and third patterns described above. Note that in a case of operating two or more services shared by the plurality of broadcasting providers listed in the third pattern described above, it is assumed that the LLS session is also shared.

In the initial scan process and the rescan process, the SLT metadata and the RRT metadata can be acquired and the channel selection information can be obtained by repeating the frequency scan in each predetermined frequency band. However, in a case where an operation is performed such that a plurality of services (channels) is transmitted in one RF channel, it is impossible to identify whether all the SLT metadata and RRT metadata have been acquired even after necessary information is acquired in each frequency band. As a result, the reception apparatus 20 cannot complete the frequency scan until a timeout occurs, and processing time of the initial scan process and the rescan process has been long.

Therefore, a proposal for performing the frequency scan at a higher speed has been desired. Therefore, in the present technology, it is allowed to specify the number of providers information indicating the number of broadcasting providers providing services in the same frequency band with num_of_provider in the header part of the LLS table transmitted in the LLS stream.

With this arrangement, in a case where one or more broadcasting providers provide one or more services in the same frequency band, when performing the initial scan process and the rescan process, the reception apparatus 20 can identify the number of SLT metadata and RRT metadata to be acquired according to the number of providers information in each frequency band. As a result, when making a transition between the frequency bands in which the frequency scan is performed, the reception apparatus 20 can make a transition without waiting for a timeout and can perform the frequency scan at a higher speed.

3. Specific Example of Initial Scan Process of the Present Technology

Next, with reference to FIGS. 7 to 9, specific examples of the initial scan process to be performed by the reception apparatus 20 will be described. Here, for the sake of comparison, the current initial scan process flow will be first described with reference to FIG. 7, and then the initial scan process flows of the present technology will be described with reference to FIGS. 8 and 9.

That is, the current initial scan process is an initial scan process in a case where the number of providers information (num_of_provider) is not included in the LLS table. Meanwhile, the initial scan process of the present technology is an initial scan process in a case where the number of providers information (num_of_provider) is included in the LLS table.

(Current Initial Scan Process Flow)

Figure 7:
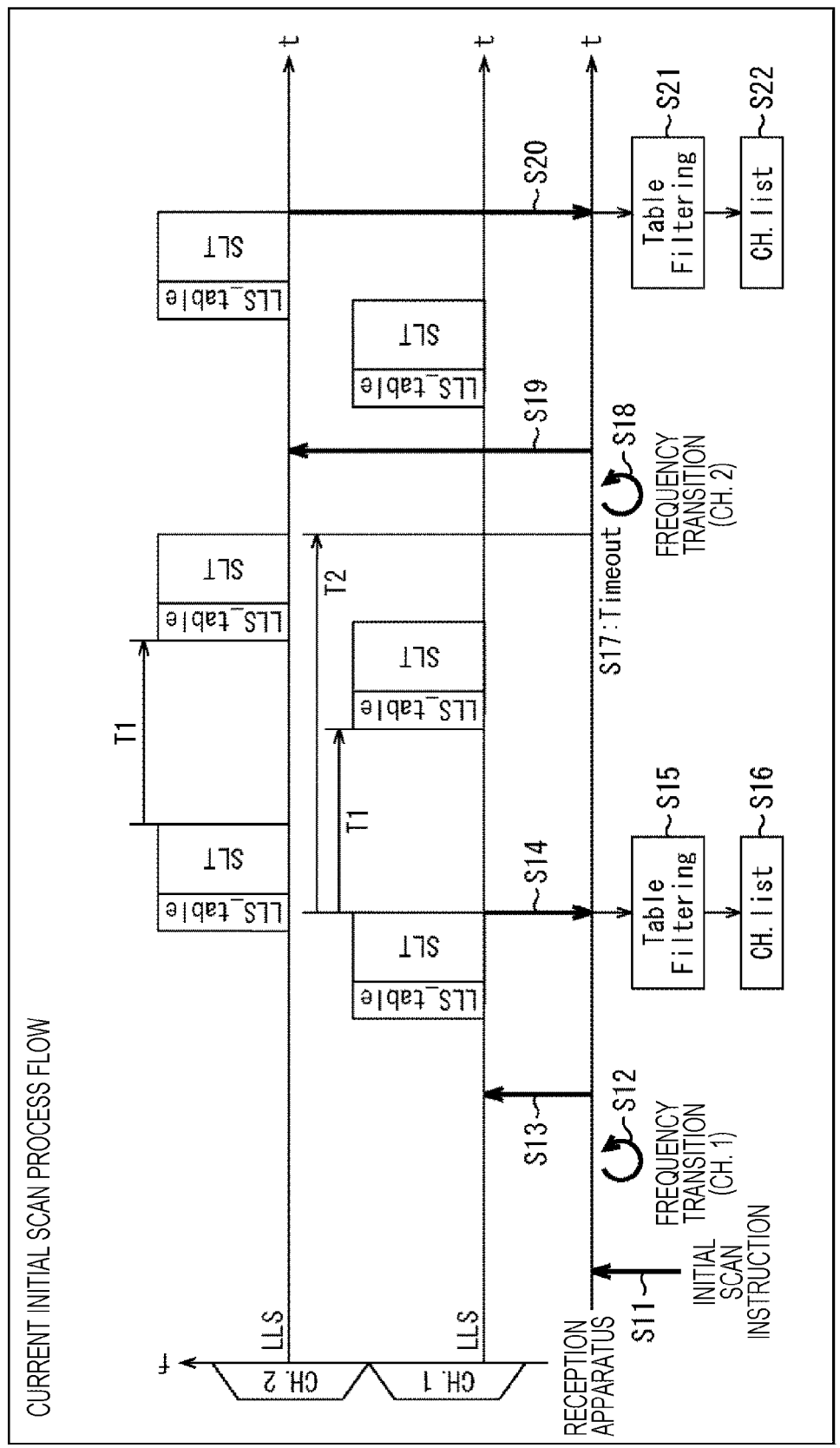
FIG. 7 is a diagram describing a current initial scan process flow.

FIG. 7 is a diagram describing the current initial scan process flow.

In FIG. 7, a vertical direction represents the frequency bands for respective RF channels and the reception apparatus that performs the frequency scan in the frequency bands, whereas a horizontal direction represents time. Note that FIG. 7 illustrates only the frequency bands corresponding to an RF channel 1 (CH. 1) and an RF channel 2 (CH. 2) among a plurality of frequency bands which are subjected to the frequency scan by the reception apparatus 20.

A service of one broadcasting provider is transmitted in each of the frequency band corresponding to the RF channel 1 (CH. 1) and the frequency band corresponding to the RF channel 2 (CH. 2). Here, a description is made with one broadcasting provider of the RF channel 1 (CH. 1) referred to as a broadcasting station A, and one broadcasting provider of the RF channel 2 (CH. 2) referred to as a broadcasting station B.

Note that in FIG. 7, "T1" represents a transmission period of the SLT metadata, and "T2" represents the maximum transmission period of the SLT metadata. Also, although LLS to be acquired at a time of the initial scan includes the SLT metadata and the RRT metadata, only the SLT metadata will be described here for simplification of description.

First, in the reception apparatus 20, when an instruction for the initial scan is given (S11), the frequency band of the RF channel 1 (CH. 1) is selected from among a plurality of frequency bands (S12). With this arrangement, the reception apparatus 20 starts a process on a stream transmitted in the frequency band of the RF channel 1 (CH. 1) (S13).

Then, the reception apparatus 20 captures the LLS stream transmitted in the frequency band of the RF channel 1 (CH. 1) according to the fixed IP address and port number prescribed in advance (S14). Also, the reception apparatus 20 performs a filtering process with LLS_table_id, provider_id, and LLS_table_version, and acquires the target SLT metadata (S15).

In this filtering process, the broadcasting provider in the RF channel (for example, broadcasting station) is determined with provider_id, a type of signaling included in the LLS table (for example, SLT metadata) is determined with LLS_table_id, and a version of the signaling is determined with LLS_table_version. With this arrangement, a service list of the broadcasting station A to be transmitted in the frequency band of the RF channel 1 (CH. 1) is obtained (S16).

After that, the reception apparatus 20 continues the process on the stream transmitted in the frequency band of the RF channel 1 (CH. 1). When the transmission period T1 of the SLT metadata elapses, the reception apparatus 20 can capture the LLS stream and acquire the SLT metadata from the LLS table. However, here, LLS_table_id, provider_id, and LLS_table_version are the same as the LLS table processed in step S15 described above, and the target SLT metadata has been obtained, and thus the SLT metadata is neglected.

Then, in the reception apparatus 20, when the maximum transmission period T2 of the SLT metadata elapses, the SLT metadata of all the broadcasting stations to be transmitted in the frequency band of the RF channel 1 (CH. 1) is completed, and thus the process on the stream transmitted in the frequency band of the RF channels 1 (CH. 1) is finished (S17). That is, a timeout occurs when the maximum transmission period T2 of the SLT metadata elapses.

Next, in the reception apparatus 20, among the plurality of frequency bands, the frequency band that is subjected to the frequency scan is transitioned from the RF channel 1 (CH. 1) to the RF channel 2 (CH. 2) (S18). With this arrangement, the reception apparatus 20 starts the process on the stream to be transmitted in the frequency band of the RF channel 2 (CH. 2) (S19).

Then, the reception apparatus 20 captures the LLS stream transmitted in the frequency band of the RF channel 2 (CH. 2) according to the fixed IP address and port number prescribed in advance (S20). Also, the reception apparatus 20 performs the filtering process with LLS_table_id, provider_id, and LLS_table_version, and acquires the target SLT metadata (S21). With this arrangement, the service list of the broadcasting station B to be transmitted in the frequency band of the RF channel 2 (CH. 2) is obtained (S22).

Repeated detailed description of the subsequent initial scan process will be omitted. In the RF channel 2 (CH. 2), in a similar manner to the RF channel 1 (CH. 1), when the transmission period T1 of the SLT metadata elapses, the SLT metadata can be acquired; however, the target SLT metadata has already been acquired, and thus the SLT metadata is neglected. Then, when the maximum transmission period T2 of the SLT metadata elapses, all the SLT metadata transmitted in the frequency band of the RF channel 2 (CH. 2) is completed. Therefore, the process on the stream transmitted in the frequency band of the RF channel 2 (CH. 2) is finished.

Also, about RF channels after the RF channel 3 (CH. 3) among the plurality of frequency bands, in a similar manner to the RF channel 1 (CH. 1) and the RF channel 2 (CH. 2) described above, until the maximum transmission period T2 of the SLT metadata elapses, the filtering process on the LLS table transmitted in the LLS stream is performed, and the target SLT metadata is acquired. Then, since the service list is obtained in each frequency band by repeating the frequency scan in all the frequency bands, the channel selection information is generated from the list.

The current initial scan process flow has been described above. Since the number of providers information (num_of_provider) is not included in the LLS table in the current initial scan process flow, the reception apparatus cannot identify whether acquisition of the SLT metadata is completed. Therefore, the reception apparatus 20 always has a problem as described above that the scan process in the frequency band of the target RF channel cannot be completed until the maximum transmission period T2 of each metadata transmitted as LLS elapses, and the process time of the initial scan process becomes long.

Note that the initial scan process has been described here, but a case of the rescan process is also similar. In particular, in a case where the reception apparatus 20 is a mobile receiver such as a mobile phone and a smartphone, or a vehicle-mounted device mounted in a vehicle, when the rescan process takes a long time after the viewing area changes, viewing interruption time becomes longer, causing disadvantage for a user.

Therefore, next, with reference to FIGS. 8 and 9, the initial scan process flow of the present technology in which the problem of the current initial scan process flow is improved will be described.

(Initial Scan Process Flow 1 of the Present Technology)

Figure 8:
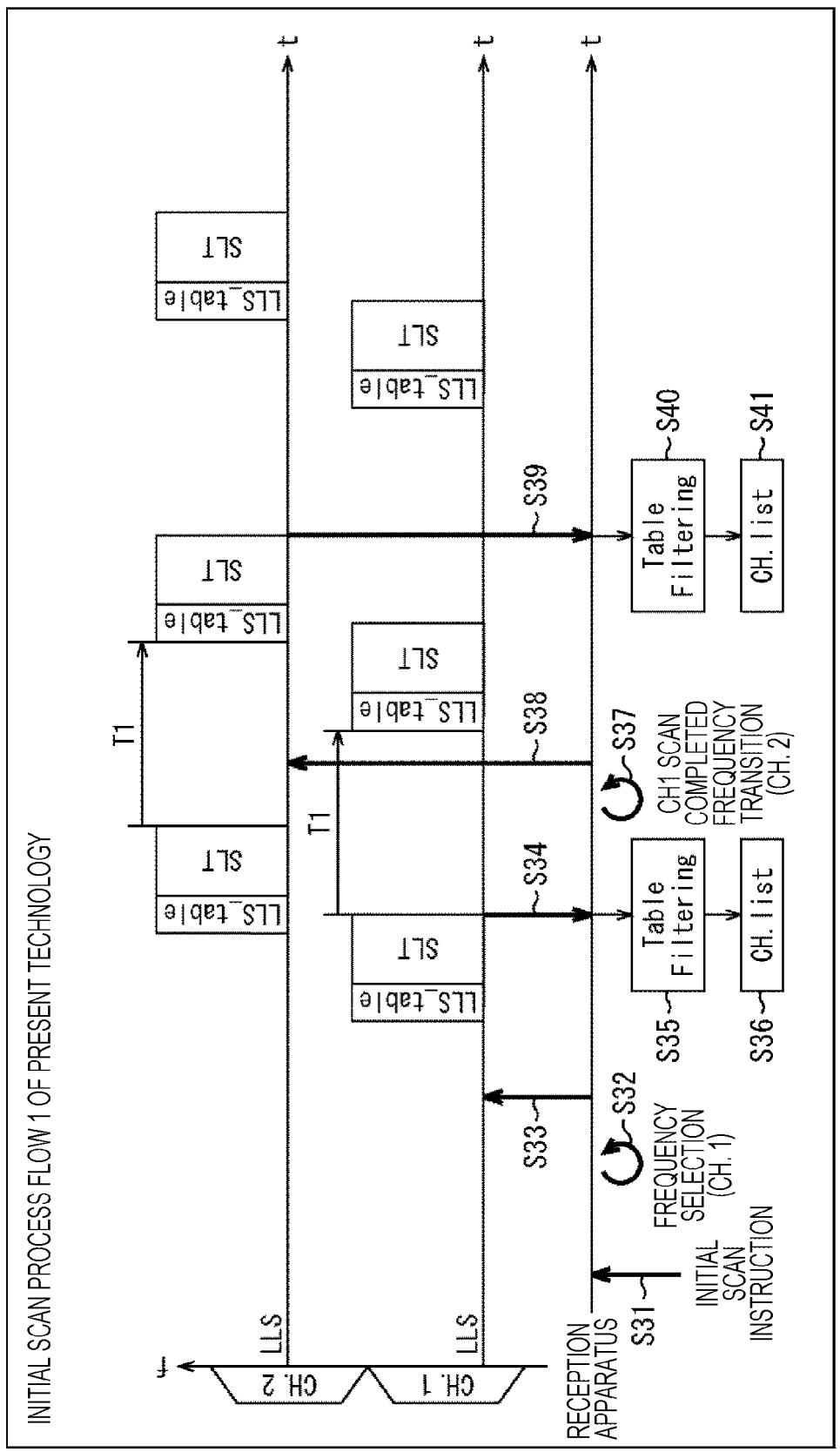
FIG. 8 is a diagram describing an initial scan process flow 1 of the present technology.

FIG. 8 is a diagram describing the initial scan process flow 1 of the present technology.

In FIG. 8, in a similar manner to FIG. 7, a vertical direction represents the frequency bands for respective RF channels and the reception apparatus 20 that performs the frequency scan in the frequency bands, whereas a horizontal direction represents time. Note that FIG. 8 illustrates, among the plurality of frequency bands which are subjected to the frequency scan by the reception apparatus 20, only the frequency band corresponding to the RF channel 1 (CH. 1) in which a service of the broadcasting station A is transmitted and the frequency band corresponding to the RF channel 2 (CH. 2) in which a service of the broadcasting station B is transmitted.

First, in the reception apparatus 20, when the instruction for the initial scan is given (S31), the frequency band of the RF channel 1 (CH. 1) is selected from among the plurality of frequency bands (S32). With this arrangement, the reception apparatus 20 starts a process on a stream to be transmitted in the frequency band of the RF channel 1 (CH. 1) (S33).

Then, the reception apparatus 20 captures the LLS stream transmitted in the frequency band of the RF channel 1 (CH. 1) according to the fixed IP address and port number prescribed in advance (S34). Also, the reception apparatus 20 performs the filtering process with LLS_table_id, provider_id, and LLS_table_version, and acquires the target SLT metadata (S35).

In this filtering process, the broadcasting provider in the RF channel (for example, broadcasting station) is determined with provider_id, the type of signaling included in the LLS table (for example, SLT metadata) is determined with LLS_table_id, and the version of the signaling is determined with LLS_table_version. With this arrangement, the service list of the broadcasting station A transmitted in the frequency band of the RF channel 1 (CH. 1) is obtained (S36).

Here, other than LLS_table_id, provider_id, and LLS_table_version to be used in the filtering process, num_of_provider is described in the LLS table processed in step S35. This num_of_provider is the number of providers information and indicates the number of broadcasting providers in a case where one or more broadcasting providers provide one or more services in the same frequency band (RF channel). In the example of FIG. 8, in the frequency band corresponding to the RF channel 1 (CH. 1), only the service of the broadcasting station A is transmitted, and 1 is set as num_of_provider.

Therefore, if the reception apparatus 20 can acquire only one SLT metadata of one broadcasting station A according to num_of_provider included in the LLS table, the reception apparatus 20 can identify that acquisition of the SLT metadata transmitted in the frequency band corresponding to the RF channel 1 (CH. 1) is completed. That is, when the reception apparatus 20 acquires the SLT metadata and the service list of the broadcasting station A (S35, S36), this means that acquisition of the SLT metadata of all the broadcasting stations transmitted in the frequency band of the RF channel 1 (CH. 1) is completed.

Therefore, the reception apparatus 20 ends the process on the stream transmitted in the frequency band of the RF channel 1 (CH. 1), and the frequency scan target is transitioned from the RF channel 1 (CH. 1) to the RF channel 2 (CH. 2) (S37). With this arrangement, the reception apparatus 20 starts the process on the stream to be transmitted in the frequency band of the RF channel 2 (CH. 2) (S38).

Then, the reception apparatus 20 captures the LLS stream transmitted in the frequency band of the RF channel 2 (CH. 2) according to the fixed IP address and port number prescribed in advance (S39). Also, the reception apparatus 20 performs the filtering process with LLS_table_id, provider_id, and LLS_table_version, and acquires the target SLT metadata (S40). With this arrangement, the service list of the broadcasting station B transmitted in the frequency band of the RF channel 2 (CH. 2) is obtained (S41).

In addition, also here, in the example of FIG. 8, in the frequency band corresponding to the RF channel 2 (CH. 2), only the service of the broadcasting station B is transmitted, and 1 is set as num_of_provider.

Therefore, if the reception apparatus 20 can acquire only one SLT metadata of one broadcasting station B according to num_of_provider included in the LLS table, the reception apparatus 20 can identify that acquisition of the SLT metadata transmitted in the frequency band corresponding to the RF channel 2 (CH. 2) is completed. That is, when the reception apparatus 20 obtains the SLT metadata and obtains the service list of the broadcasting station B (S40, S41), this means that acquisition of the SLT metadata of all the broadcasting stations transmitted in the frequency band of the RF channel 2 (CH. 2) is completed.

Although repeated detailed description of the subsequent initial scan process will be omitted, also about the RF channels after the RF channel 3 (CH. 3) among the plurality of frequency bands, in a similar manner to the RF channel 1 (CH. 1) and the RF channel 2 (CH. 2) described above, the filtering process on the LLS table transmitted in the LLS stream is performed until the SLT metadata corresponding to the number of broadcasting providers indicated by the number of providers information (num_of_provider) is acquired, and the target SLT metadata is acquired. Then, by repeating the frequency scan in all the frequency bands, the service list is obtained for each frequency band, and the channel selection information is generated from the list.

The initial scan process flow 1 of the present technology has been described above. In the initial scan process flow 1 of the present technology, since the number of providers information (num_of_provider) is included in the LLS table, with this number of providers information (num_of_provider), it is possible to determine whether there is still SLT metadata to be checked for acquisition (update). Then, while the frequency scan on the target RF channel is continued in a case where there is SLT metadata that has not been checked yet, in a case where all the SLT metadata to be transmitted in the target RF channel has been acquired, the frequency scan on the target RF channel is finished, transition to the next RF channel is made, and the frequency scan on the next RF channel is performed.

Therefore, in the initial scan process flow 1 of the present technology, as in the current initial scan process flow described above, the RF channel to be subjected to the frequency scan is transitioned without waiting for a timeout due to the maximum transmission period T2 of each metadata to be transmitted as LLS, and thus the frequency scan can be performed at a higher speed.

(Initial Scan Process Flow 2 of the Present Technology)

Figure 9:
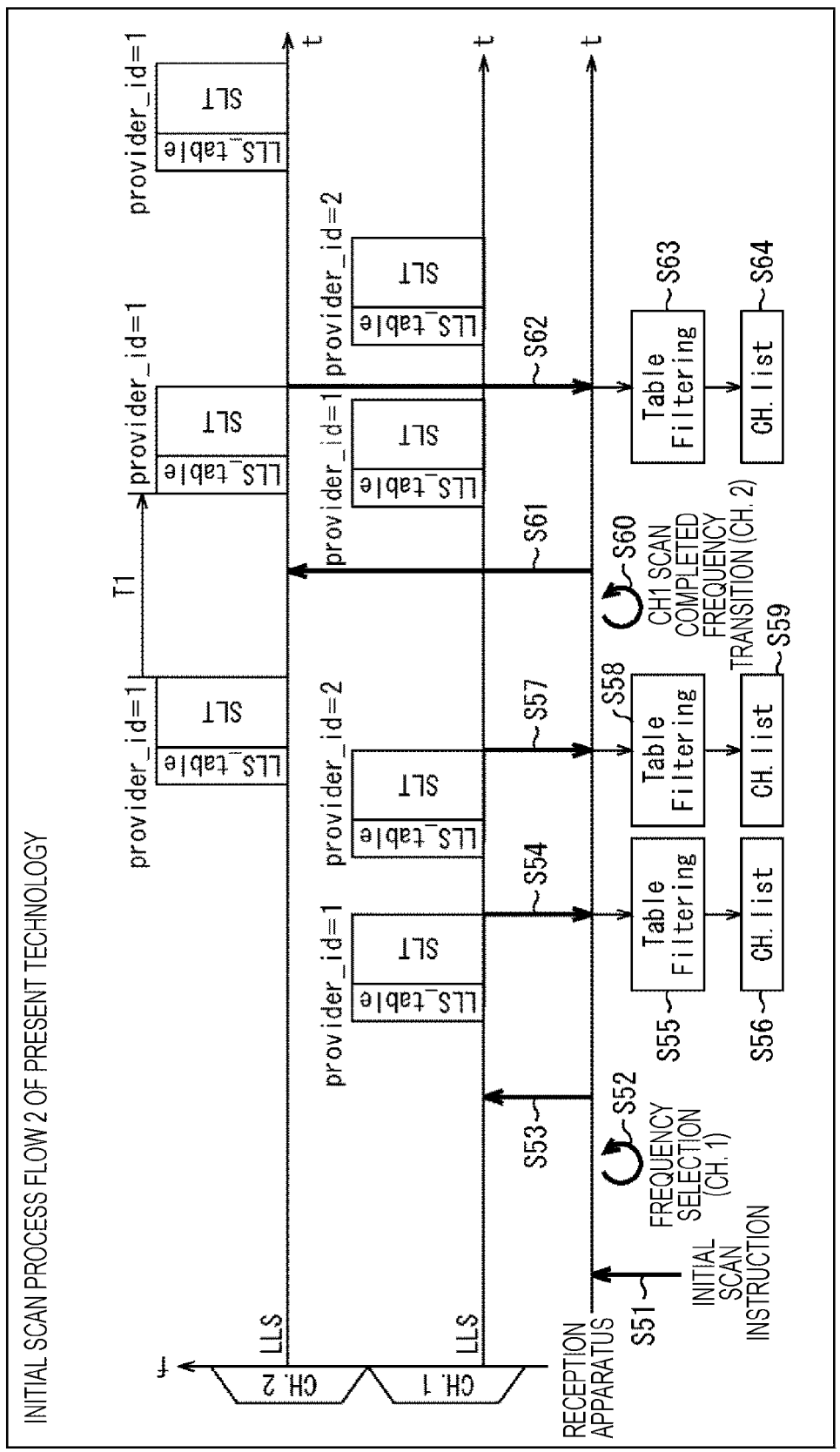
FIG. 9 is a diagram describing an initial scan process flow 2 of the present technology.

FIG. 9 is a diagram describing an initial scan process flow 2 of the present technology.

In FIG. 9, in a similar manner to FIG. 8, a vertical direction represents the frequency bands for respective RF channels and the reception apparatus 20 that performs the frequency scan in the frequency bands, whereas a horizontal direction represents time. Note that FIG. 9 illustrates, among the plurality of frequency bands which are subjected to the frequency scan by the reception apparatus 20, only the frequency band corresponding to the RF channel 1 (CH. 1) in which services of the broadcasting station A and the broadcasting station B are transmitted, and the frequency band corresponding to the RF channel 2 (CH. 2) in which a service of the broadcasting station C is transmitted.

First, in the reception apparatus 20, when an instruction for the initial scan is given (S51), the frequency band of the RF channel 1 (CH. 1) is selected from among the plurality of frequency bands (S52). With this arrangement, the reception apparatus 20 starts a process on a stream to be transmitted in the frequency band of the RF channel 1 (CH. 1) (S53).

Then, the reception apparatus 20 captures the LLS stream transmitted in the frequency band of the RF channel 1 (CH. 1) according to the fixed IP address and port number prescribed in advance (S54). Also, the reception apparatus 20 performs the filtering process with LLS_table_id, provider_id, and LLS_table_version, and acquires the target SLT metadata (S55). With this arrangement, the service list of the broadcasting station A to be transmitted in the frequency band of the RF channel 1 (CH. 1) is obtained (S56).

Here, other than LLS_table_id, provider_id, and LLS_table_version to be used in the filtering process, num_of_provider is described in the LLS table processed in step S55. In the example of FIG. 9, in the frequency band corresponding to the RF channel 1 (CH. 1), the service of the broadcasting station A and the service of the broadcasting station B are transmitted, and 2 is set as num_of_provider.

Therefore, if the reception apparatus 20 does not acquire the SLT metadata of another broadcasting station (broadcasting station B) other than the SLT metadata of the broadcasting station A according to num_of_provider included in the LLS table, the reception apparatus 20 can identify that acquisition of the SLT metadata transmitted in the frequency band corresponding to the RF channel 1 (CH. 1) is not completed.

Therefore, the reception apparatus 20 continues the process on the stream transmitted in the frequency band of the RF channel 1 (CH. 1), and captures the LLS stream transmitted in the frequency band of the RF channel 1 (CH. 1) (S57). In addition, the reception apparatus 20 performs the filtering process with LLS_table_id, provider_id, and LLS_table_version, and obtains the target SLT metadata (S58). With this arrangement, the service list of the broadcasting station B transmitted in the frequency band of the RF channel 1 (CH. 1) is obtained (S59).

With this arrangement, since the reception apparatus has acquired the SLT metadata of the two broadcasting stations including the SLT metadata of the broadcasting station A and the SLT metadata of the broadcasting station B, this means that acquisition of the SLT metadata of all the broadcasting stations to be transmitted in the frequency band of the RF channel 1 (CH. 1) is completed.

Therefore, the reception apparatus 20 ends the process on the stream to be transmitted in the frequency band of the RF channel 1 (CH. 1), and the frequency scan target is transitioned from the RF channel 1 (CH. 1) to the RF channel 2 (CH. 2) (S60). With this arrangement, the reception apparatus 20 starts the process on the stream to be transmitted in the frequency band of the RF channel 2 (CH. 2) (S61).

Then, the reception apparatus 20 captures the LLS stream transmitted in the frequency band of the RF channel 2 (CH. 2) according to the fixed IP address and port number prescribed in advance (S62). Also, the reception apparatus 20 performs the filtering process with LLS_table_id, provider_id, and LLS_table_version, and acquires the target SLT metadata (S63). With this arrangement, the service list of the broadcasting station C transmitted in the frequency band of the RF channel 2 (CH. 2) is obtained (S64).

Also here, in the example of FIG. 9, in the frequency band corresponding to the RF channel 2 (CH. 2), only the service of the broadcasting station C is transmitted, and 1 is set as num_of_provider.

Therefore, if the reception apparatus 20 can acquire only one SLT metadata of one broadcasting station C according to num_of_provider included in the LLS table, the reception apparatus 20 can identify that acquisition of the SLT metadata transmitted in the frequency band corresponding to the RF channel 2 (CH. 2) is completed. That is, when the reception apparatus 20 has acquired the SLT metadata and the service list of the broadcasting station C (S63, S64), this means that acquisition of the SLT metadata of all the broadcasting stations transmitted in the frequency band of the RF channel 2 (CH. 2) is completed.

Although repeated detailed description of the subsequent initial scan process will be omitted, also about the RF channels after the RF channel 3 (CH. 3) among the plurality of frequency bands, in a similar manner to the RF channel 1 (CH. 1) and the RF channel 2 (CH. 2) described above, the filtering process on the LLS table to be transmitted in the LLS stream is performed until the SLT metadata corresponding to the number of broadcasting providers indicated by the number of providers information (num_of_provider) is acquired, and the target SLT metadata is acquired. Then, by repeating the frequency scan in all the frequency bands, the service list is obtained for each frequency band, and the channel selection information is generated from the list.

The initial scan process flow 2 of the present technology has been described above. In the initial scan process flow 2 of the present technology, since the number of providers information (num_of_provider) is included in the LLS table, with this number of providers information (num_of_provider), it is possible to determine whether there is still SLT metadata to be checked for acquisition (update). Then, while the frequency scan of the target RF channel is continued in a case where there is SLT metadata that has not been checked yet, in a case where all the SLT metadata to be transmitted in the target RF channel has been acquired, the frequency scan of the target RF channel is finished, transition to the next RF channel is made, and the frequency scan on the next RF channel is performed.

Therefore, in the initial scan process flow 2 of the present technology, as in the current initial scan process flow described above, the RF channel to be subjected to the frequency scan is transitioned without waiting for a timeout due to the maximum transmission period T2 of each metadata transmitted as LLS, and thus the frequency scan can be performed at a higher speed.

Note that in the initial scan process flows 1 and 2 of the present technology, the initial scan process has been described, but the rescan process is also similar. In addition, in order to simplify the description, the description of a case where only the SLT metadata is acquired has been made, but actually, the RRT metadata is also acquired, and the channel selection information is generated from the SLT metadata and the RRT metadata.

(Relationship Among Broadcast Transmission Path, Broadcasting Provider, and LLS)

Next, with reference to FIG. 10, the relationship among the broadcast transmission path, the broadcasting provider, and LLS will be described, the relationship being a premise for the initial scan process flow described above.

Figure 10:
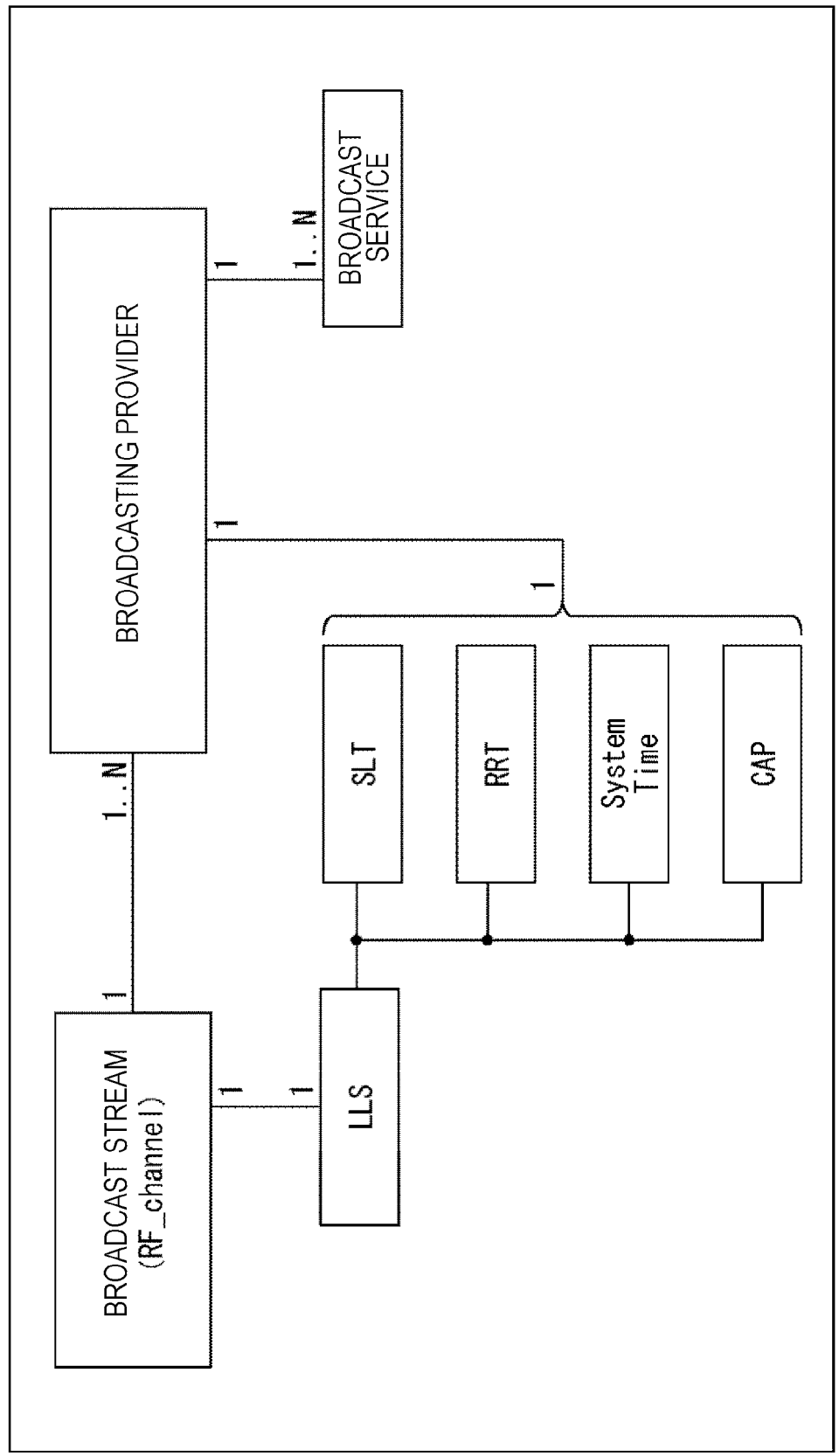
FIG. 10 is a diagram illustrating a relationship among a broadcast transmission path, a broadcasting provider, and the LLS.

The relationship between the broadcast stream that serves as a broadcast transmission path and the broadcasting provider is illustrated in FIG. 10. One or more broadcasting providers can provide one or more broadcast services (services) to one broadcast stream.

However, this broadcast stream represents a stream to be transmitted in a frequency band (for example, 6 MHz) corresponding to a predetermined RF channel (RF_channel). One or more broadcasting providers provide one or more broadcast services (services) in the same frequency band (for example, 6 MHz).

Also, regarding the relationship between the broadcast stream and LLS, for one broadcast stream, an LLS table that stores one signaling is transmitted in the LLS stream. That is, the signaling to be transmitted as LLS is individually stored in (the payload part of) the LLS table and transmitted.

Therefore, even with the same type of signaling, a plurality of signalings provided by different broadcasting providers is not collectively stored in one LLS table and transmitted. For example, a plurality of SLT metadata provided by different broadcasting providers is not transmitted in one LLS table.

Also, even if provided by the same broadcasting provider, different types of signaling provided by one broadcasting provider are not collectively stored in one LLS table for transmission. For example, the SLT metadata and the RRT metadata provided by a broadcasting provider are not transmitted in one LLS table.

That is, as illustrated in FIG. 10, the relationship between a certain broadcasting provider and the SLT metadata, RRT metadata, time information (SystemTime), or CAP metadata stored in (the payload part of) the LLS table is a one-to-one relationship. Note that in a case where one broadcasting provider provides a plurality of broadcast services (services), it is possible to describe a plurality of services for one SLT metadata.

The broadcast transmission path, the broadcasting provider, and the LLS have the relationship described above.

4. Initial Scan Process Flow of the Present Technology

Next, the initial scan process flow of the present technology will be described with reference to flowcharts of FIGS. 11 to 14.

(Initial Scan Process)

First, with reference to the flowchart of FIG. 11, the initial scan process flow to be executed by the reception apparatus 20 of FIG. 1 will be described.

In step S211, the control unit 211 monitors the operation signal and the like from the input unit 213. In a case where an initial scan process start event occurs, the control unit 211 starts the initial scan process, and the process proceeds to step S212.

In step S212, the reception unit 214 performs a frequency scan process on a frequency band of a predetermined RF channel in response to control by the control unit 211. In step S213, it is determined whether the frequency scan is successful by the frequency scan process in step S212.

In a case where it is determined in step S213 that the frequency scan has failed, the process returns to the process of step S212, and the frequency scan process is performed again. On the other hand, in a case where it is determined in step S213 that the frequency scan is successful, the process proceeds to step S214.

In step S214, an LLS acquisition process is performed. In this LLS acquisition process, an LLS table is acquired from an LLS stream transmitted in the frequency band of the predetermined RF channel, and a process according to a signaling included in the LLS table is performed. Note that details of the LLS acquisition process will be described later with reference to the flowchart of FIG. 12.

When the LLS acquisition process is completed, the process proceeds to step S215. In step S215, it is determined whether the frequency scan in all frequency bands is completed.

In a case where it is determined in step S215 that the frequency scan in all the frequency bands is incomplete, the process returns to step S212, and the process from step S212 is repeated. With this arrangement, the frequency scan process is performed in each frequency band, the SLT metadata and the RRT metadata are acquired in each frequency band, and the channel selection information is recorded in the memory 212. Then, in a case where it is determined in step S215 that the frequency scan in all the frequency bands is completed, the frequency scan process of FIG. 11 is finished.

The initial scan process flow has been described above.

(LLS Acquisition Process)

Next, with reference to the flowchart of FIG. 12, details of the LLS acquisition process corresponding to the process of step S214 of FIG. 11 will be described.

In step S231, the demultiplexer 215 captures the LLS stream included in the broadcast stream transmitted in the frequency band of the predetermined RF channel in response to control by the control unit 211.

In step S232, a signaling acquisition process is performed. In this signaling acquisition process, the filtering process is performed on the LLS stream captured in the process of step S231, and the signaling such as the SLT metadata and the RRT metadata included in the LLS table is acquired.

Here, in the filtering process on the LLS stream, the broadcasting provider (for example, broadcasting station) within the RF channel is determined with provider_id, a type of signaling included in the LLS table is determined with LLS_table_id, and a signaling version is determined with LLS_table_version. An unacquired or updated signaling is acquired and recorded, whereas an already acquired signaling is discarded. Note that details of the signaling acquisition process will be described later with reference to the flowchart of FIG. 13.

When the signaling acquisition process is completed, the process proceeds to step S233. In step S233, it is determined whether a timeout has occurred by measuring a time until the signaling included in the LLS table is acquired.

That is, in a case where the maximum transmission period of each signaling has elapsed, the LLS table including the signaling is regarded as not being transmitted, and a target of the frequency scan is transitioned to the frequency band of the next RF channel. Note that the maximum transmission period of each signaling is prescribed in advance by an operating specification and the like. In other words, a case where the LLS table including the target signaling is not transmitted within the time of the maximum transmission period corresponds to a broadcast error, and therefore the operation of the reception apparatus 20 assumed at that time is prescribed by the operation specification.

In step S233, in a case where it is determined that a timeout has not occurred, the process returns to step S231, and the subsequent process is repeated. On the other hand, in a case where it is determined in step S233 that a timeout has occurred, the process returns to the process of step S214 in FIG. 11, and the subsequent process is repeated.

The LLS acquisition process flow has been described above.

(Signaling Acquisition Process)

Next, with reference to the flowchart of FIG. 13, details of the signaling acquisition process corresponding to the process of step S232 of FIG. 12 will be described.

In step S251, the control unit 211 controls the demultiplexer 215 to check a value of LLS_table_id in the header part of the LLS table stored in the LLS packet included in the LLS stream, and determines a type of signaling included in the payload part.

As a result of determination in step S251, in a case where it is determined that the signaling is SLT metadata or RRT metadata, the process proceeds to step S252. In step S252, the control unit 211 determines whether num_of_provider in the header part of the LLS table processed in step S251 has already been set.

In step S252, in a case where it is determined that num_of_provider has not been set, the process proceeds to step S253. In step S253, the control unit 211 controls the demultiplexer 215 to acquire num_of_provider from the header part of the LLS table processed in step S251. Also, the control unit 211 registers the number (number of providers) indicated by num_of_provider (number of providers information) acquired from the header part of the LLS table.

If the process of step S253 is finished, the process proceeds to step S254. Also, in a case where it is determined in step S252 that num_of_provider has already been set, it is not necessary to register num_of_provider again, and therefore the process of step S253 is skipped and the process proceeds to step S254.

In step S254, the control unit 211 controls the demultiplexer 215 to check the value of LLS_table_version in the header part of the LLS table processed in step S251, and determines whether the LLS table is a new LLS table or whether the LLS table is an LLS table with an updated version.

In step S254, in a case where it is determined that the LLS table is a new LLS table or a LLS table with an updated version, the process proceeds to step S255. In step S255, the control unit 211 controls the demultiplexer 215 to acquire the SLT metadata or the RRT metadata from the payload part of the new LLS table or the LLS table with an updated version. Then, the control unit 211 records, in the memory 212, the service list of the target broadcasting provider obtained from the SLT metadata or the RRT metadata.

In step S256, the control unit 211 determines whether acquisition of all the signalings of the number of providers registered in the process of step S253 has been completed.

Figure 12:
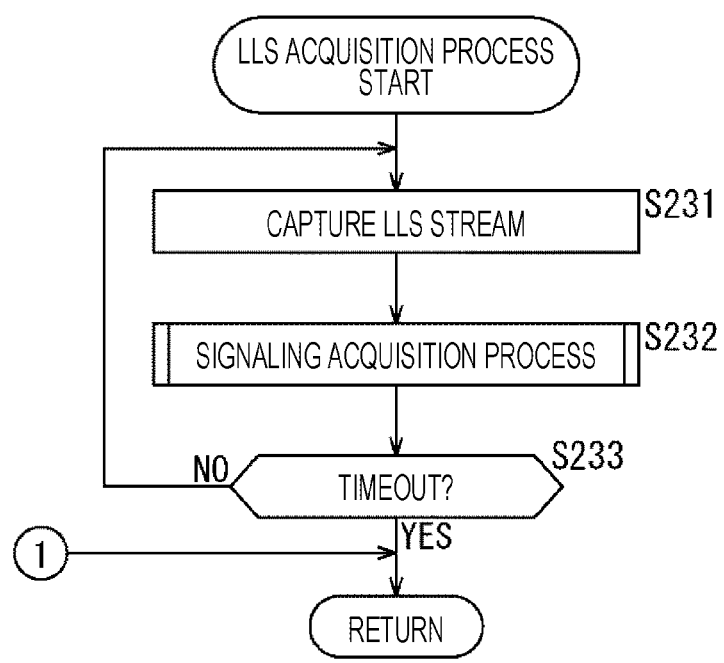
FIG. 12 is a flowchart describing an LLS acquisition process.
Figure 13:
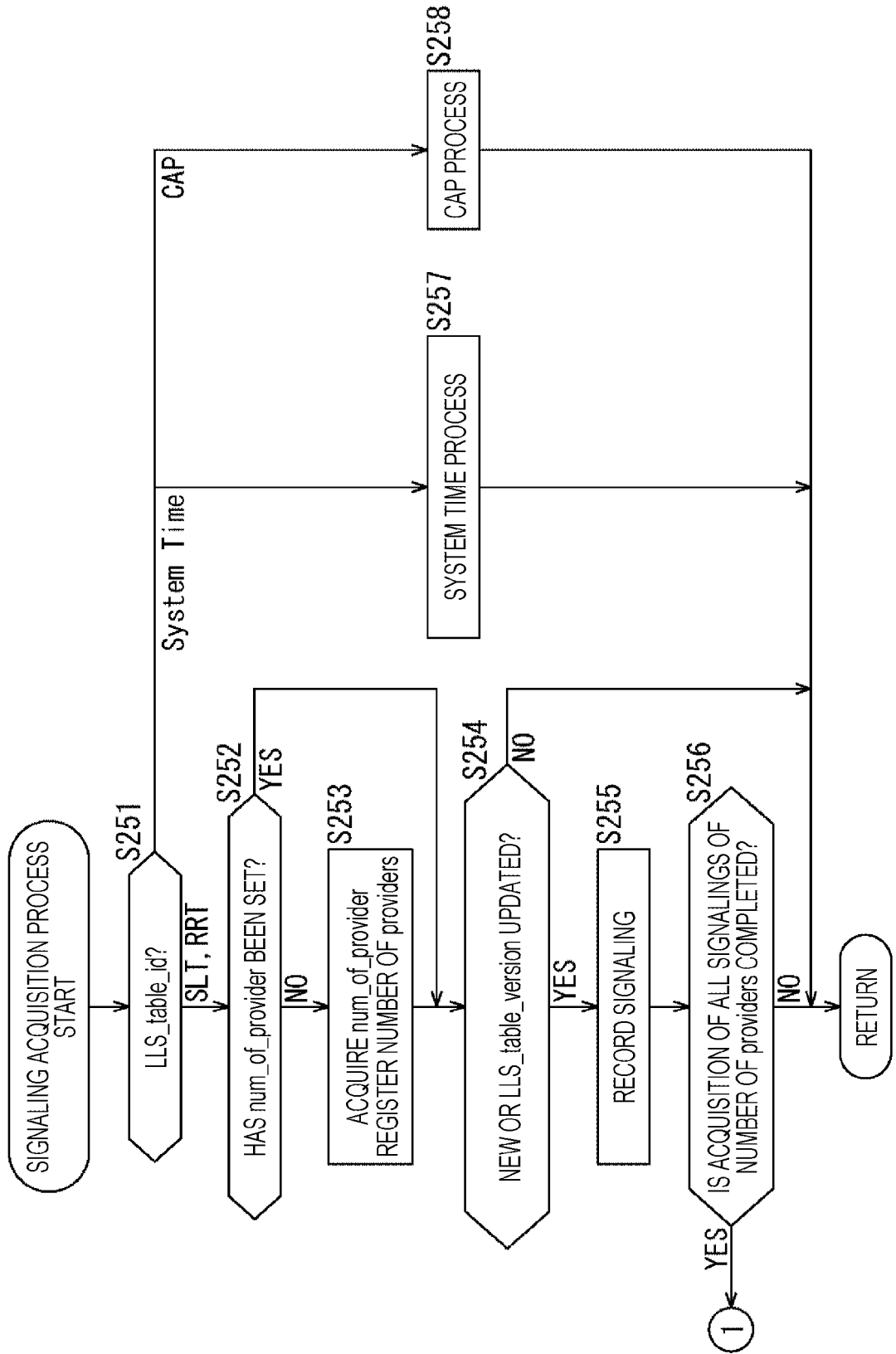
FIG. 13 is a flowchart describing a signaling acquisition process.

In a case where it is determined in step S256 that acquisition of all the signalings of the number of providers has not been completed, the process returns to step S232 in FIG. 12, and the subsequent process is repeated. That is, the process of step S232 in FIG. 12 (process of steps S251 to S256 in FIG. 13) is repeated until all the signalings of the number of providers (SLT metadata or RRT metadata) are acquired and recorded in the memory 212.

Figure 11:
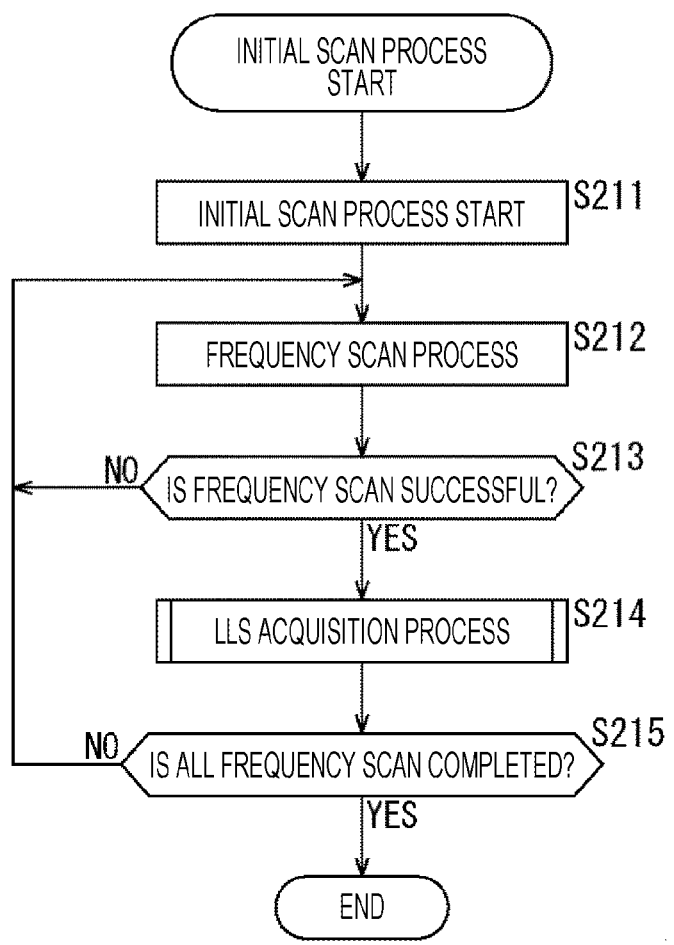
FIG. 11 is a flowchart describing the initial scan process.

Also, in a case where it is determined in step S256 that acquisition of all the signalings of the number of providers has been completed, the process returns to the process of step S214 in FIG. 11. Then, in a case where it is determined that the scan of all the frequency bands is incomplete ("NO" in S215 of FIG. 11), the frequency scan process on the next frequency band is performed.

In this manner, since the number of SLT metadata and RRT metadata (number of providers) to be acquired according to the number of providers information (num_of_provider) in the header part of the LLS table can be identified, it becomes possible to make a transition without waiting for a timeout when the frequency band in which the frequency scan is performed is transitioned, and the frequency scan can be performed at a higher speed.

Note that in a case where it is determined in step S254 that the LLS table is not a new LLS table or an LLS table with an updated version, the target LLS table has already been acquired, and thus the process of steps S255 to S256 is skipped. Then, in this case, the process returns to step S232 in FIG. 12, and the subsequent process is repeated.

Meanwhile, in a case where it is determined that the signaling is time information (SystemTime) as a result of determination in step S251, the process proceeds to step S257. In step S257, the control unit 211 performs a system time process on the basis of the time information (SystemTime) placed in the payload part of the LLS table processed in step S251.

Also, in a case where it is determined that the signaling is CAP metadata as a result of determination in step S251, the process proceeds to step S258. In step S258, the control unit 211 performs a CAP process on the basis of the CAP metadata placed in the payload part of the LLS table processed in step S251.

If the process of step S257 or S258 is finished, the process returns to step S232 in FIG. 12, and the subsequent process is repeated.

The signaling acquisition process flow has been described above.

In this manner, in the initial scan process, with the number of providers information (num_of_provider) in the header part of the LLS table, in the frequency band of the target RF channel, the reception apparatus 20 can recognize (identify) the number of broadcasting providers (broadcasting stations) that provide the broadcast service (service), that is, the number of SLT metadata and RRT metadata transmitted in the LLS stream in pre-processing that analyzes the signaling included in the LLS table. With this arrangement, the reception apparatus 20 can identify the number of SLT metadata and RRT metadata to be efficiently checked, and can perform the frequency scan at a higher speed without waiting for a timeout due to the maximum transmission period of signaling.

(Transmission and Reception Process)

Finally, with reference to the flowchart of FIG. 14, a transmission and reception process flow to be executed by the transmission apparatus 10 and the reception apparatus 20 of FIG. 1 will be described.

Figure 14:
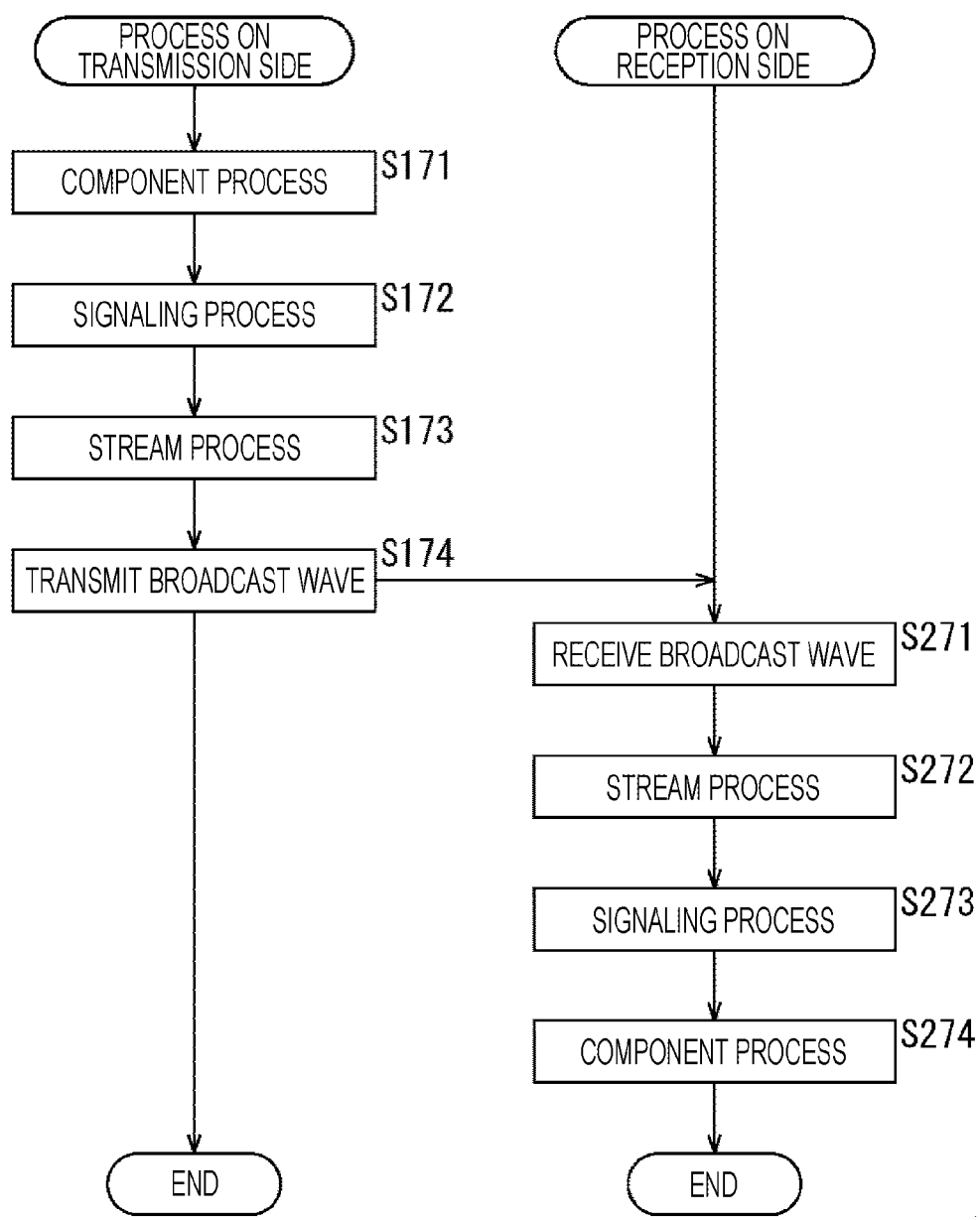
FIG. 14 is a flowchart describing a transmission and reception process.

Note that in FIG. 14, the process of steps S171 to S174 is the process to be executed by the transmission apparatus 10, whereas the process of steps S271 to S274 is the process to be executed by the reception apparatus 20.

In step S171, the process on components such as video, audio, and subtitles is performed.

Here, the video data acquisition unit 112, the audio data acquisition unit 114, and the subtitles data acquisition unit 116 acquire video data, audio data, and subtitles data, respectively. The video processing unit 113, the audio processing unit 115, and the subtitles processing unit 117 perform processes such as an encoding process on the video data, the audio data, and the subtitles data, respectively.

In step S172, the process on the signaling is performed.

Here, the signaling is generated by the signaling generation unit 118, and a predetermined process is performed on the signaling by the signaling processing unit 119. Note that in a case where the LLS table including the signaling such as the SLT metadata and the RRT metadata in the payload part is generated, in addition to LLS_table_id, provider_id, and LLS_table_version, num_of_provider as the number of providers information is included in the header part.

In step S173, the multiplexer 120 multiplexes the component stream obtained in the process of step S171 and the signaling stream obtained in the process of step S172 to obtain the multiplexed stream.

In step S174, the transmission unit 121 performs processes such as a modulation process on the multiplexed stream obtained in the process of step S173, and transmits the resulting broadcast stream as a broadcast wave of digital broadcasting via the antenna 131.

In step S271, the reception unit 214 receives the broadcast wave of digital broadcasting via the antenna 231. The reception unit 214 performs processes such as a demodulation process on the broadcast stream obtained from the broadcast wave to obtain the multiplexed stream.

In step S272, the demultiplexer 215 separates the multiplexed stream obtained in the process of step S271 and obtains the component stream and the signaling stream.

In step S273, the process on the signaling obtained in the process of step S272 is performed.

Here, in a case where the initial scan process or the rescan process is performed, the channel selection information obtained from the signaling (LLS) is acquired by the control unit 211 and recorded in the memory 212. In this initial scan process and the rescan process, as described with reference to FIGS. 8 and 9 and FIGS. 11 to 13, the frequency scan is performed in each frequency band of the RF channel by using the number of providers information (num_of_provider) included in the header part of the LLS table.

Also, in a case where the service selection process is performed, the control unit 211 controls the demultiplexer 215 and the like on the basis of the channel selection information recorded in the memory 212, and processes the signaling (SLS) of the service to be selected.

In step S274, the process on the component such as video, audio, and subtitles obtained in the process of step S272 is performed.

Here, in a case where the service selection process is performed, the control unit 211 controls the demultiplexer 215, the processing unit of each component, and the like, and content of the service to be selected (such as a broadcast program) is reproduced. That is, the video processing unit 216, the audio processing unit 218, and the subtitles processing unit 220 perform processes such as the decoding process, and the video output unit 217 and the audio output unit 219 output video data, audio data, and subtitles data.

The transmission and reception process flow has been described above.

5. Modification

ATSC (in particular, ATSC 3.0) that is a method employed in countries such as the United States has been mentioned in the above description as a standard for digital broadcasting; however, the present technology may be applied to integrated services digital broadcasting (ISDB) that is a method employed in countries such as Japan, digital video broadcasting (DVB) that is a method employed in respective countries such as European countries, and other methods. Also, ATSC 3.0 in which the IP transmission method is employed has been mentioned as an example in the above description; however, the present technology may be applied not only to the IP transmission method but also to other methods such as an MPEG2-transport stream (TS) method, for example.

Also, as standards for digital broadcasting, in addition to terrestrial broadcasting, the present technology is also applicable to standards such as satellite broadcasting using a satellite such as a broadcasting satellite (BS) and a communication satellite (CS), and cable broadcasting such as cable television (CATV).

Moreover, names described above such as signaling and packet are merely one example, and other names may be used in some cases. However, a difference between these names is a perfunctory difference, and substantial details such as the target signaling and packet are not different. For example, an ATSC link-layer protocol (ALP) packet may be referred to as a generic packet, a type length value (TLV) packet, or some other packet in some cases. Furthermore, non real time (NRT) may be referred to as locally cached content (LCC) or the like.

Furthermore, the present technology is also applicable to a predetermined standard (standard other than the standard of digital broadcasting) and the like prescribed on the assumption that a transmission path other than a broadcasting network is used as a transmission path, that is, for example, a communication line (communication network) or the like such as the Internet and a telephone network. In that case, the communication line such as the Internet and a telephone network is used as the transmission path 30 of the transmission system 1 (FIG. 1), and the transmission apparatus 10 can be a server provided on the Internet. Then, the communication server and the reception apparatus 20 perform bidirectional communication via the transmission path 30 (communication line).

6. Configuration of Computer

A series of processes described above can be executed by hardware and can also be executed by software. In a case where the series of processes is executed by software, a program constituting the software is installed in a computer. FIG. is a diagram illustrating a configuration example of hardware of a computer that executes the above-described series of processes by the program.

Ina computer 1000, a central processing unit (CPU) 1001, a read only memory (ROM) 1002, and a random access memory (RAM) 1003 are connected to each other via a bus 1004. An input output interface 1005 is further connected to the bus 1004. An input unit 1006, an output unit 1007, a recording unit 1008, a communication unit 1009, and a drive 1010 are connected to the input output interface 1005.

The input unit 1006 includes a keyboard, a mouse, a microphone, or the like. The output unit 1007 includes a display, a speaker, or the like. The recording unit 1008 includes a hard disk, a nonvolatile memory, or the like. The communication unit 1009 includes a network interface or the like. The drive 1010 drives a removable recording medium 1011 such as a magnetic disk, an optical disk, a magneto-optical disk, or a semiconductor memory.

In the computer 1000 configured as described above, the CPU 1001 loads a program recorded in the ROM 1002 or the recording unit 1008 into the RAM 1003 via the input output interface 1005 and the bus 1004, and executes the program, thereby executing the series of processes described above.

The program to be executed by the computer 1000 (CPU 1001) can be recorded and provided, for example, in a removable recording medium 1011 that serves as a package medium or the like. Also, the program can be provided via a wired or wireless transmission medium such as a local area network, the Internet, and digital satellite broadcasting.

In the computer 1000, the program can be installed in the recording unit 1008 via the input output interface 1005 by attaching the removable recording medium 1011 to the drive 1010. Also, the program can be received by the communication unit 1009 via the wired or wireless transmission medium and installed in the recording unit 1008. In addition, the program can be installed in the ROM 1002 or the recording unit 1008 in advance.

Here, in this specification, the process to be executed by the computer in accordance with the program does not necessarily have to be performed in chronological order in accordance with order described as the flowchart. That is, the process to be executed by the computer in accordance with the program also includes processes that are executed in parallel or individually (for example, parallel processing or processing by an object). Furthermore, the program may be processed by one computer (processor) and may undergo distributed processing by a plurality of computers.

Note that the embodiment of the present technology is not limited to the embodiment described above, and various modifications may be made without departing from the spirit of the present technology.

Furthermore, the present technology can have the following configurations.

(1) A reception apparatus including:
a reception unit configured to receive a broadcast wave; and
a control unit configured to perform a frequency scan on the broadcast wave on the basis of the number of providers information indicating the number of broadcasting providers providing a service in the same frequency band to generate channel selection information for selecting the service.
(2) The reception apparatus according to (1), in which the number of providers information indicates the number of broadcasting providers in a case where one or more broadcasting providers provide one or more services in the same frequency band.
(3) The reception apparatus according to (1) or (2), in which the number of providers information is included in a header part added to a table that allows control information including information regarding channel selection of the service to be stored in a payload part.
(4) The reception apparatus according to (3), in which the table is transmitted for each of the broadcasting providers.
(5) The reception apparatus according to (3) or (4), in which
the table is transmitted in an Internet Protocol (IP) packet including a user datagram protocol (UDP) packet, and
the table is identified with a fixed IP address and a fixed port number.
(6) The reception apparatus according to any of (3) to (5), in which in a case where the control information according to the number of broadcasting providers indicated by the number of providers information is acquired by the frequency scan in a certain frequency band, the control unit transitions to a next frequency band and performs the frequency scan.
(7) A data processing method for a reception apparatus, the data processing method including the steps of, by the reception apparatus:
receiving a broadcast wave; and
performing a frequency scan on the broadcast wave on the basis of the number of providers information indicating the number of broadcasting providers providing a service in the same frequency band to generate channel selection information for selecting the service.
(8) A transmission apparatus including:
a generation unit configured to generate the number of providers information indicating the number of broadcasting providers providing a service in the same frequency band; and
a transmission unit configured to transmit the generated number of providers information by a broadcast wave.
(9) The transmission apparatus according to (8), in which the number of providers information indicates the number of broadcasting providers in a case where one or more broadcasting providers provide one or more services in the same frequency band.
(10) The transmission apparatus according to (8) or (9), in which the number of providers information is included in a header part added to a table that allows control information including information regarding channel selection of the service to be stored in a payload part.
(11) The transmission apparatus according to (10), in which the table is transmitted for each of the broadcasting providers.
(12) The transmission apparatus according to (10) or (11), in which
the table is transmitted in an IP packet including a UDP packet, and
the table is identified with a fixed IP address and a fixed port number.
(13) The transmission apparatus according to any of (10) to (12), in which the transmission unit transmits content together with the control information by the broadcast wave.
(14) A data processing method for a transmission apparatus, the data processing method including the steps of, by the transmission apparatus:
generating the number of providers information indicating the number of broadcasting providers providing a service in the same frequency band; and
transmitting the generated number of providers information by a broadcast wave.

REFERENCE SIGNS LIST

1 Transmission system
10 Transmission apparatus
20 Reception apparatus
30 Transmission path
111 Control unit
112 Video data acquisition unit
113 Video data processing unit
114 Audio data acquisition unit
115 Audio data processing unit
116 Subtitles data acquisition unit
117 Subtitles processing unit
118 Signaling generation unit
119 Signaling processing unit
120 Multiplexer
121 Transmission unit
211 Control unit
212 Memory
213 Input unit
214 Reception unit
215 Demultiplexer
216 Video processing unit
217 Video output unit
218 Audio processing unit
219 Audio output unit
220 Subtitles processing unit
221 Display unit
222 Speaker
1000 Computer
1001 CPU

The invention claimed is:
1. A reception apparatus comprising:
circuitry configured to:
receive one or more low level signaling (LLS) tables from an LLS stream in a broadcast stream, each of the one or more LLS tables including a provider identifier indicating a provider with which the respective LLS table is associated, and a numerical parameter indicating a number of different provider identifiers included in the LLS stream,
maintain a current number of different provider identifiers indicating the number of different provider identifiers received in the LLS stream, determine that receipt of a set of service list information from the LLS stream is completed in a case that the current number of different provider identifiers has reached the number of different provider identifiers indicated by the numerical parameter, and in a case that a maximum transmission period after receipt of a first one of the one of the one or more LLS tables has elapsed and the current number of different provider identifiers has not reached the number of different provider identifiers indicated by the numerical parameter, and generate service information based on the set of service list information.

2. The reception apparatus of claim 1, wherein the set of service list information is included in at least one service list table (SLT).

3. The reception apparatus of claim 1, wherein the circuitry is configured to:

receive a further set of service list information from a further LLS stream after the receipt of the service list information from the LLS stream has been determined to have been completed, and generate the service information based on the further set of service list information.

4. The reception apparatus of claim 1, wherein each of the one or more LLS tables includes a header part with the provider identifier and the numerical parameter; and at least one of the one or more LLS tables includes a payload part with one part of the set of service list information associated with the provider.

5. The reception apparatus of claim 1, wherein the one or more LLS tables is transmitted in a user datagram protocol (UDP) over an Internet Protocol (IP) packet stream, and identified with a fixed IP address and a fixed port number.

6. A method for a reception apparatus, the method comprising:

receiving one or more low level signaling (LLS) tables from an LLS stream in a broadcast stream, each of the one or more LLS tables including a provider identifier indicating a provider with which the respective LLS table is associated, and a numerical parameter indicating a number of different provider identifiers included in the LLS stream, maintaining, by processing circuitry of the reception apparatus, a current number of different provider identifiers indicating the number of different provider identifiers received in the LLS stream, determining, by the processing circuitry of the reception apparatus, that receipt of a set of service list information from the LLS stream is completed in a case that the current number of different provider identifiers has reached the number of different provider identifiers indicated by the numerical parameter, and in a case that a maximum transmission period after receipt of a first one of the one of the one or more LLS tables has elapsed and the current number of different provider identifiers has not reached the number of different provider identifiers indicated by the numerical parameter, and generating service information based on the set of service list information.

7. The method of claim 6, wherein the set of service list information is included in at least one service list table (SLT).

8. The method of claim 6, further comprising:

receiving a further set of service list information from a further LLS stream after the receipt of the set of service list information from the LLS stream has been determined to have been completed; and generating the service information based on the further set of service list information.

9. The method of claim 6, wherein each of the one or more LLS tables includes a header part with the provider identifier and the numerical parameter, and at least one of the one or more LLS tables includes a payload part with one part of the set of service list information associated with the provider.

10. The method of claim 6, wherein the one or more LLS tables is transmitted in a user datagram protocol (UDP) over an Internet Protocol (IP) packet stream, and identified with a fixed IP address and a fixed port number.

11. A non-transitory computer-readable medium storing instructions which when executed by a computer cause the computer to perform a method, and the method comprising:

receiving one or more low level signaling (LLS) tables from an LLS stream in a broadcast stream, each of the one or more LLS tables including a provider identifier indicating a provider with which the respective LLS table is associated, and a numerical parameter indicating a number of different provider identifiers included in the LLS stream;

maintaining a current number of different provider identifiers indicating the number of different provider identifiers received in the LLS stream;

determining that receipt of a set of service list information from the LLS stream is completed in a case that the current number of different provider identifiers has reached the number of different provider identifiers indicated by the numerical parameter, and in a case that a maximum transmission period after receipt of a first one of the one of the one or more LLS tables has elapsed and the current number of different provider identifiers has not reached the number of different provider identifiers indicated by the numerical parameter; and generating service information based on the set of service list information.

12. The non-transitory computer-readable medium according to claim 11, wherein the set of service list information is included in at least one service list table (SLT).

13. The non-transitory computer-readable medium according to claim 11, wherein the method further comprises:

receiving a further set of service list information from a further LLS stream after the receipt of the set of service list information from the LLS stream has been determined to have been completed; and generating the service information based on the further set of service list information.

14. The non-transitory computer-readable medium according to claim 11, wherein each of the one or more LLS tables includes a header part with the provider identifier and the numerical parameter, and at least one of the one or more LLS tables includes a payload part with one part of the set of service list information associated with the provider.

15. The non-transitory computer-readable medium according to claim 11, wherein the one or more LLS tables is transmitted in a user datagram protocol (UDP) over an Internet Protocol (IP) packet stream, and identified with a fixed IP address and a fixed port number.

* * * * *